United States Patent [19]

Iwami et al.

[11] Patent Number: 5,528,284
[45] Date of Patent: Jun. 18, 1996

[54] VIDEO COMMUNICATION METHOD HAVING REFRESH FUNCTION OF CODING SEQUENCE AND TERMINAL DEVICES THEREOF

[75] Inventors: Naoko Iwami; Keiko Takahara; Susumu Matsui, all of Machida, Japan

[73] Assignee: Hitachi, Ltd., Tokyo, Japan

[21] Appl. No.: 194,268

[22] Filed: Feb. 10, 1994

[30] Foreign Application Priority Data

Feb. 10, 1993 [JP] Japan .................................... 5-022382

[51] Int. Cl.⁶ ........................................................ H04N 1/00
[52] U.S. Cl. ............................ 348/13; 349/19; 358/405; 358/434
[58] Field of Search .................................. 348/12, 13, 15, 348/19, 7, 16, 17, 466, 412, 415; 371/32; 370/94.1; 358/405; H04N 1/00

[56] References Cited

U.S. PATENT DOCUMENTS

| | | | |
|---|---|---|---|
| 4,422,171 | 10/1983 | Wortley | 371/32 |
| 4,829,524 | 5/1989 | Yoshida | 341/32 |
| 5,057,938 | 10/1991 | Edamura | 358/434 |
| 5,172,246 | 12/1992 | Yoshida | 358/405 |
| 5,247,347 | 9/1993 | Litteral et al. | 348/12 |
| 5,386,234 | 1/1995 | Veltman et al. | 348/412 |

*Primary Examiner*—Safet Metjahic
*Assistant Examiner*—Jeffrey S. Murrell
*Attorney, Agent, or Firm*—Antonelli, Terry, Stout & Kraus

[57] ABSTRACT

In a video communication system including a sending terminal and a receiving terminal connected via a packet switching network, a receiving terminal which has detected loss of a video packet sets a video output into a freeze status and transmits a refresh request command to the sending terminal. Upon receiving the refresh request command, the sending terminal requests a video coder unit to execute refreshing and transmits a series of video packets beginning from an INTRA frame. Upon receiving a packet of the INTRA frame, the receiving terminal releases the freeze status and restarts video information decoding.

21 Claims, 18 Drawing Sheets

VIDEO COMMUNICATION METHOD HAVING REFRESH FUNCTION OF CODING SEQUENCE AND TERMINAL DEVICES THEREOF

BACKGROUND OF THE INVENTION

1. Field of the Invention

The present invention relates to a method of video communication performed between terminal devices connected to a communication network and terminal devices thereof. In particular, the present invention relates to a video communication method and terminal devices having refresh function of coding sequence.

2. Description of the Related Art

Video coding applied to video communication systems follows the coding rule determined in CCITT recommendation H.261 (video coding standard for video communication) which is an international standard. Coding frames generated by the above described video coding include INTRA frames and INTER frames. Each INTRA frame is obtained by "intraframe coding for coding video information of one frame." Each INTER frame is obtained by "interframe predictive coding for coding differential information between one video frame to be coded and one preceding video frame." The above described INTRA frames are generated intermittently. Video information to be transmitted is coded in a predetermined coding sequence so that a plurality of INTER frames may follow one generated INTRA frame.

The above described video coding is premised on an image communication system in which two terminals communicates with each other via a circuit switching network having an assured transmission capacity. A sending terminal sends consecutively coded video information at a fixed rate, whereas a receiving terminal consecutively supplies received video information to a decoding circuit.

However, a conventional video communication scheme adopting the above described inter frame predictive coding has a weakness in that normal reproduction of images from INTER frames cannot be performed when an impermissible gap has occurred in coded video information to be supplied to the decoding circuit in the receiving terminal or when a part of coded video information has been lost during transmission in the network.

Therefore, if video communication using the above described video coding is applied to communication between terminals connected to a packet network for transmitting packeted information, the communication is affected by loss and delay of video packets occurring in the network. Furthermore unadvantageously, once the received image has been disturbed, the receiving terminal cannot output normal video images until the next INTRA frame is sent from the sending terminal.

SUMMARY OF THE INVENTION

An object of the present invention is to provide a video communication method and terminal devices whereby even when an abnormality has occurred in coded video information under communication, disturbance of the reproduced image in the receiving terminal can be limited to a short time and rapid restoration to the normal status can be made.

Another object is to provide a video communication method and terminal devices which are suitable for communication performed between terminals via a packet switching network and which, even when arrival delay or loss has occurred in video packets, allows rapid restoration of received video decoding to the normal status.

Another object of the present invention is to provide a video communication method and terminal devices whereby occurrence of arrival delay of video packets is prevented and, even when an abnormality has occurred, output of received video information can be rapidly normalized.

In order to achieve the above described object, a video communication method according to the present invention includes the steps of converting, in a sending terminal, video information to first coded video information obtained from video information of a single frame or second coded video information obtained from video information of a plurality of frames, transmitting coded video information from the sending terminal while repeating a predetermined coding sequence having the second coded video information of a plurality of frames after the first coded video information, issuing, in the receiving terminal, a refresh request of the coding sequence to the sending terminal when loss of coded video information to be received has been sensed, and restoring, in the sending terminal in response to the refresh request, coding operation of inputted video information to an initial sequence status beginning from the conversion to the first coded video information. That is to say, in the present invention, the sending terminal transmits an INTRA frame immediately in response to a refresh request sent from the receiving side. In a short time after the image has been disturbed, therefore, the receiving terminal can receive the above described INTRA frame and normalize the output image.

In case the present invention is applied to image communication between terminals connected to a packet switching network, the above described first and second coded video information is edited to form packets having a predetermined format and transmitted to the network. In this case, one packet may be formed for each video frame. Alternatively, the above described first and second coded video information continuing in each sequence, for example, may be divided into a plurality of blocks each having a predetermined length and each block may be edited to form a packet having a predetermined format.

In accordance with one implementation form of the present invention, the receiving terminal monitors receiving interval of coded video packets, judges that a video packet has been lost when the receiving interval exceeds a predetermined permissible time, and issues a refresh request to the sending terminal. In case a refresh request has been issued, the receiving terminal may abort received video packets until a video packet of the next INTRA frame is received.

As for sensing the loss of a coded video packet in the receiving terminal, it may be judged by, for example, providing, in the sending terminal, each video packet with a sequence number, storing, in the receiving terminal, a sequence number of the last received video packet, comparing the sequence number of a new received packet with the sequence number of an already received video packet whenever a video packet is received, and checking continuity thereof.

When loss of a coded video packet has been sensed, the receiving terminal may omit issue of a refresh request, depending on situation.

For example, the sending terminal edits video information to be transmitted and forms a coded video packet for each frame. Then the sending terminal provides each video packet with an identifier indicating a coding type which identifies an immediately preceding video packet or the current packet (distinction between an INTRA frame and an INTER frame). When loss of a video packet has been detected, the receiving terminal may wait reception of the next video packet, judge the kind of the lost packet on the basis of the coding type identifier indicated by the received video packet, and determine whether a refresh request should be issued or not.

In an alternative method, at the time of beginning of video communication, the sending terminal beforehand notifies the receiving terminal of the sending interval (INTRA interval) of the first coded video information (INTRA frame) and time required for refresh processing. When loss of a video packet has been detected, the receiving terminal compares receiving time of the next INTRA frame in case a refresh request has not been issued, which can be predicted from the above described INTRA interval, with receiving time of the next INTRA frame in case a refresh request has been issued at that instant, which can be predicted from time required for the above described refresh processing. Thereby, the receiving terminal judges whether a refresh request should be issued or not. If it is found that the next INTRA frame immediately arrives even if the current coding sequence is not refreshed, the refresh request is omitted.

When a refresh request is received from the receiving terminal, judgment as to whether the coding sequence should be refreshed may be formed by the sending terminal in response thereto.

For example, the sending terminal stores the packet sequence number associated with the last INTRA frame already sent. By issuing a refresh request, the receiving terminal notifies the sending terminal of the sequence number of a lost video packet. The sending terminal compares the stored INTRA frame packet sequence number with the sequence number of the lost video packet notified by the refresh request. If a new INTRA frame has already been transmitted after the lost video packet, refreshing the coding sequence responsive to the above described request is omitted.

Instead of the packet sequence number, the sending terminal may store information indicating the sending time of the INTRA frame packet already transmitted. When a refresh request is received, the sending terminal compares a sending time of the next INTRA frame, which is predicted from the time required for refresh processing supposing that sequence refreshing is executed at the current time, with a sending time of the next INTRA frame, which is derived from the sending time of the INTRA frame packet already transmitted and the INTRA interval in case the current sequence is maintained. Thereby, the sending terminal judges whether refresh processing should be conducted or not.

The present invention can also be applied to such a system that one sending terminal transmits video information simultaneously to a plurality of terminals. When refresh processing has been executed in this case, the sending terminal may disregard refresh requests received within a predetermined time thereafter. This aims at preventing the sending terminal from repeating refresh operation a plurality of times in a short period in response to a plurality of refresh requests issued nearly simultaneously from different receiving terminals. To be concrete, with respect to a refresh request received first, the sending terminal delays answer operation by a fixed time and during that time waits a refresh request sent from another terminal. Or the sending terminal disregards refresh requests received during refresh processing or within a fixed time thereafter.

As a variant of the present invention, the sending terminal and the receiving terminal may perform communication of control commands such as the above described refresh request and communication of video packets via separate communication media which differ in characteristic such as reliability or communication delay.

In such video communication that on the basis of coded information generated at the beginning of each coding sequence succeeding coded information is decoded, it is now assumed that images cannot be reproduced on the receiving side due to arrival delay or loss of coded video information. In accordance with the present invention, the sending terminal at this time carries out refresh operation of the coding sequence in response to a refresh request sent from the receiving terminal. Therefore, disturbance of images in the receiving terminal can be limited to a short time, and rapid restoration to the normal status is made possible.

The foregoing and other objects, advantages, manner of operation and novel features of the present invention will be understood from the following detailed description when read in conjunction with the accompanying drawings.

DESCRIPTION OF THE PREFERRED EMBODIMENTS

Figure 1:
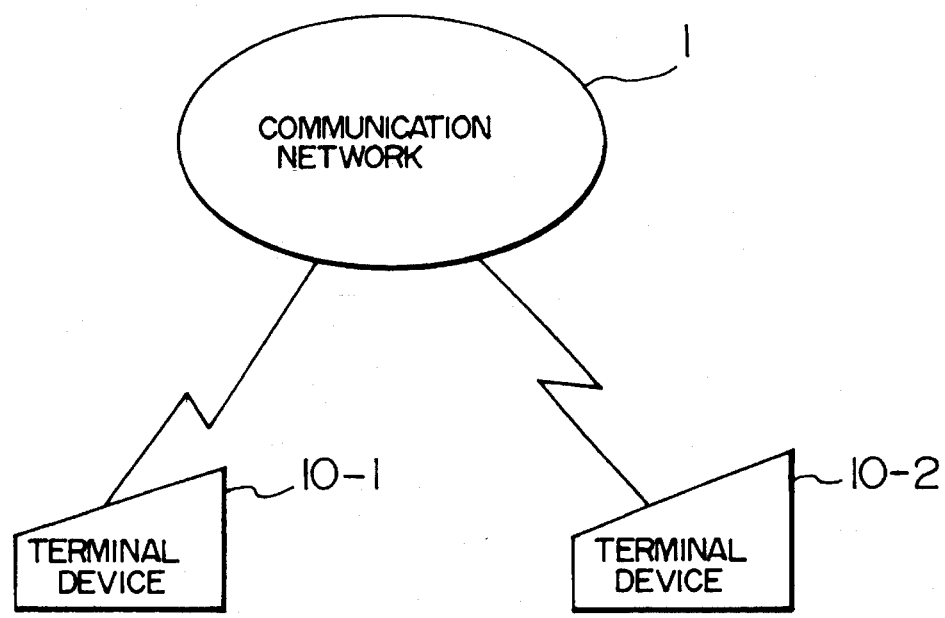
FIG. 1 is a diagram showing the configuration of an example of a video communication system implementing the present invention.

FIG. 1 shows the configuration of a video communication system for implementing the present invention.

Numeral 1 denotes a communication network. Numeral 10 (10-1, 10-2) denotes a terminal device for performing video communication via the communication network. In FIG. 1, such an example that video communication is performed between two terminals is illustrated. In the above described system configuration, however, the number of terminals may be increased and images may be transmitted from one sending terminal device 10-1 simultaneously to a plurality of terminal devices 10-2, 10-3, . . . .

Figure 2:
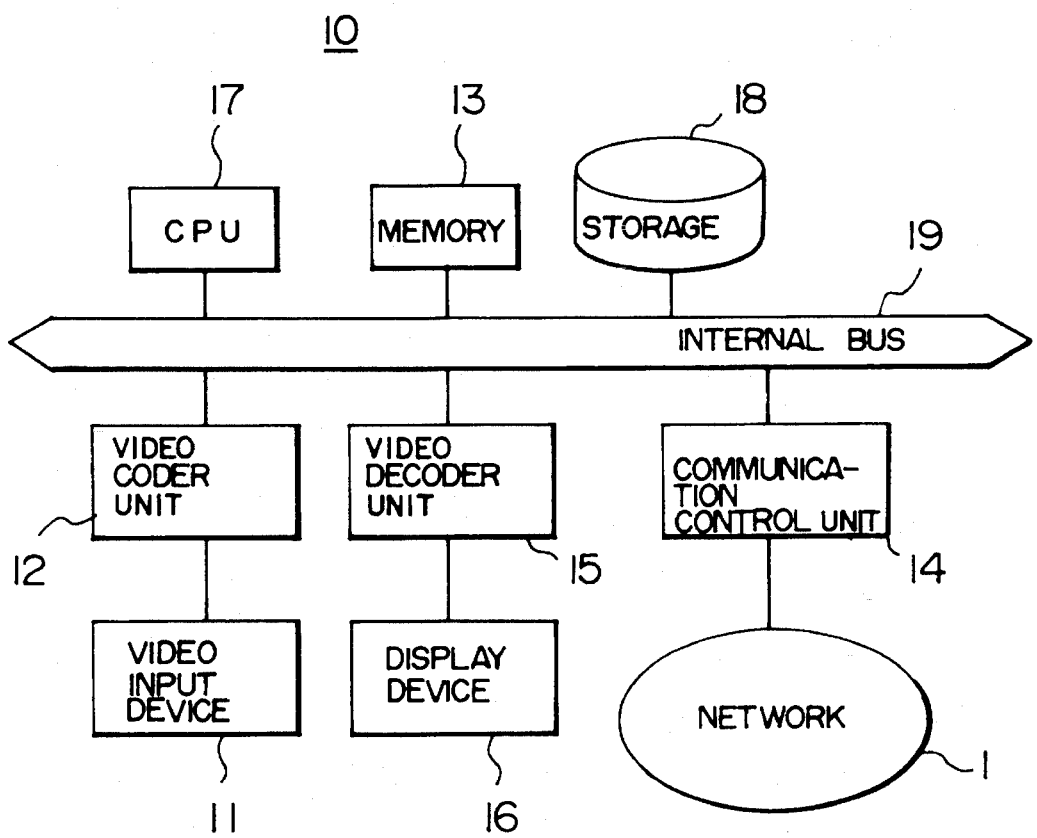
FIG. 2 is a diagram showing an example of configuration of a terminal device 10 included in the video communication system of FIG. 1.

Each terminal device 10 has a configuration as shown in FIG. 2.

In FIG. 2, numeral 17 denotes a processor (CPU) forming a controller of the terminal device. Numeral 13 denotes a memory for storing various programs to be executed by the CPU. The memory 13 includes a work area for various kinds of data processing which should be executed by the CPU and an image information storage area for video processing. Numeral 11 denotes a video input device such as a TV camera. Numeral 12 denotes a video coder unit for coding video signals outputted from the video input device 11. The memory 13 has an area for temporarily storing coded video information outputted from the video coder unit 12.

After being subjected to control processing for video communication, the coded video information is transmitted to the communication network 1 via a communication control unit 14. On the other hand, coded video information transmitted from the device of the other party (video sending terminal) via the communication network 1 is read into the memory 13 via the communication control unit 14. After being subjected to control processing of video communication, the coded video information is inputted to a video decoder unit 15. The video information decoded by the video decoder unit 15 is displayed on a display device 16.

Numeral 18 denotes a storage. The storage 18 has a storage area for image information inputted from the video input device 11 and coded by the video coder unit 12, image information from another terminal received by the communication control unit, a program to be loaded into the memory 13, and various kinds of parameter information required for video communication control processing. These components are interconnected via an internal bus 19.

Figure 3:
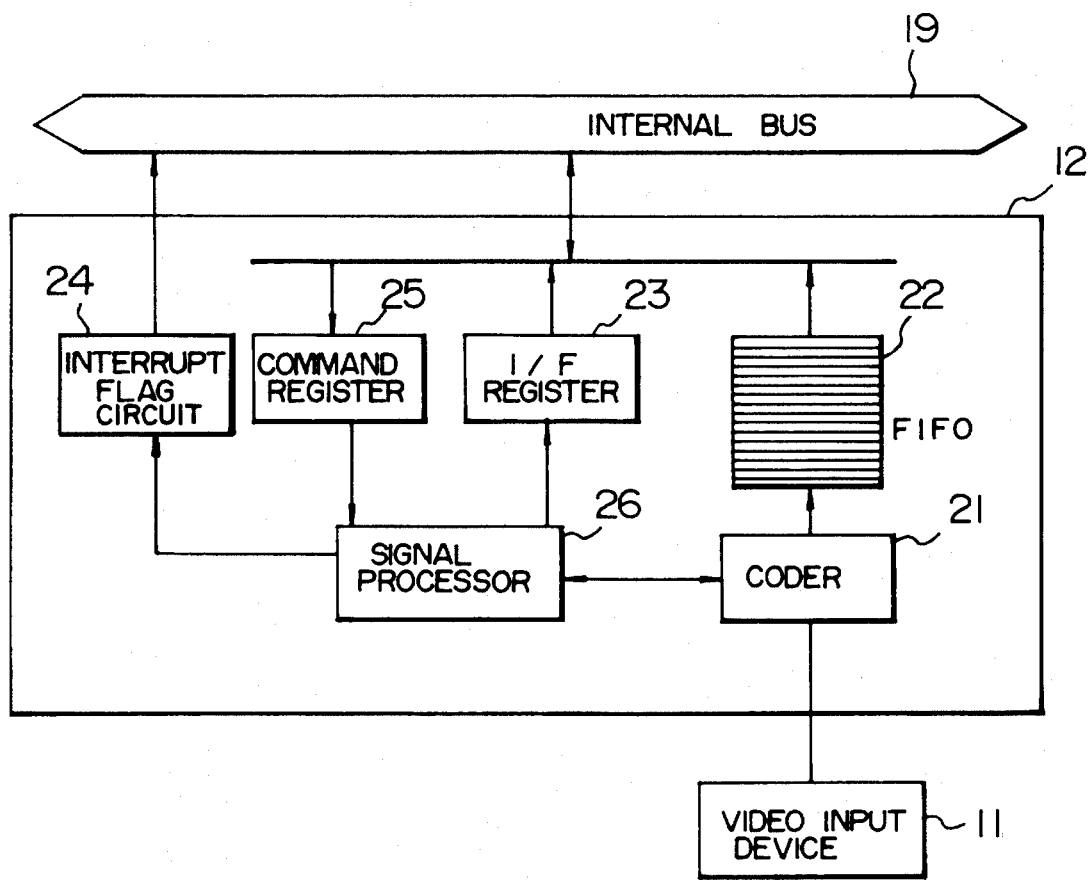
FIG. 3 is a diagram showing an example of configuration of a video coder unit 12.

FIG. 3 shows the configuration of the video coder unit 12.

Video information inputted from the video input device 11 is coded by a coder 21. Coded image data are successively inputted to a FIFO (first-in first-out) queue 22. Numeral 26 denotes a signal processor for image signal processing connected to the coder 21. Numeral 23 denotes an interface register. The interface register 23 stores the length of coded video data stored in the FIFO queue 22, information indicating whether coded data located at the top of the FIFO queue is data of the header portion of a video frame, and information indicating the type of the video frame.

Numeral 24 denotes an interrupt flag circuit for notifying an external device (CPU 17 in this case) of a coding processing situation change such as occurrence of a processing error. Numeral 25 denotes a command register for writing various request commands sent from the CPU 17 to the signal processor 26. Coded video information written into the FIFO queue 22 is successively read out onto the internal bus 19 by the CPU 17.

Figure 4:
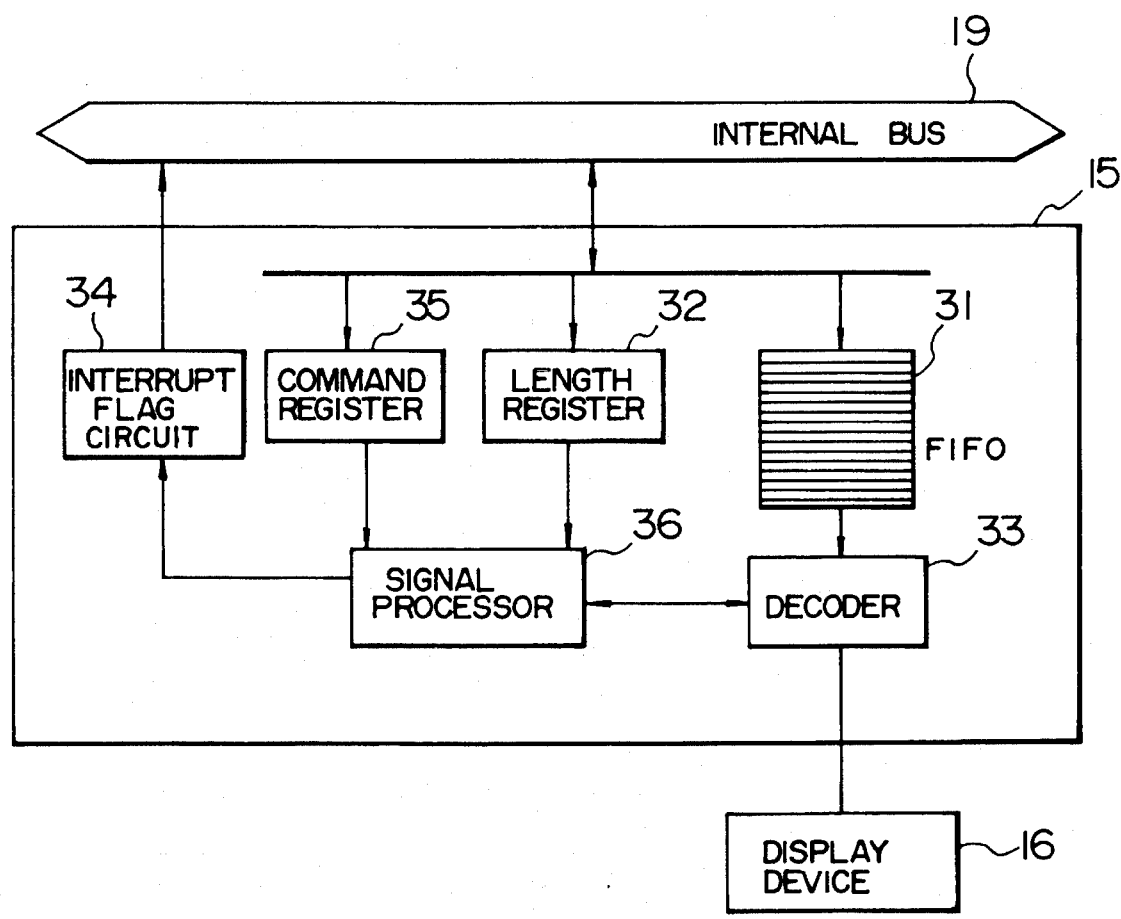
FIG. 4 is a diagram showing an example of configuration of a video decoder unit 15.

FIG. 4 shows the configuration of the video decoder unit 15.

Video information to be decoded is inputted from the internal bus 19 to a FIFO (first-in first-out) queue 31. At the same time, the value of FIFO data length stored in a length register 32 is updated. A decoder 33 reads out coded video information successively from the FIFO queue 31 and outputs decoded video information to the display device 16.

When a processing error or the like has occurred, a signal processor 36 for performing general control over decoding processing sets, in an interrupt flag circuit 34, information indicating that a change has occurred in a decoding processing situation and notifies the CPU 17 of the fact. A request from the CPU 17 to the signal processor 36 is made by a request command written into a command register 35.

Figure 5:
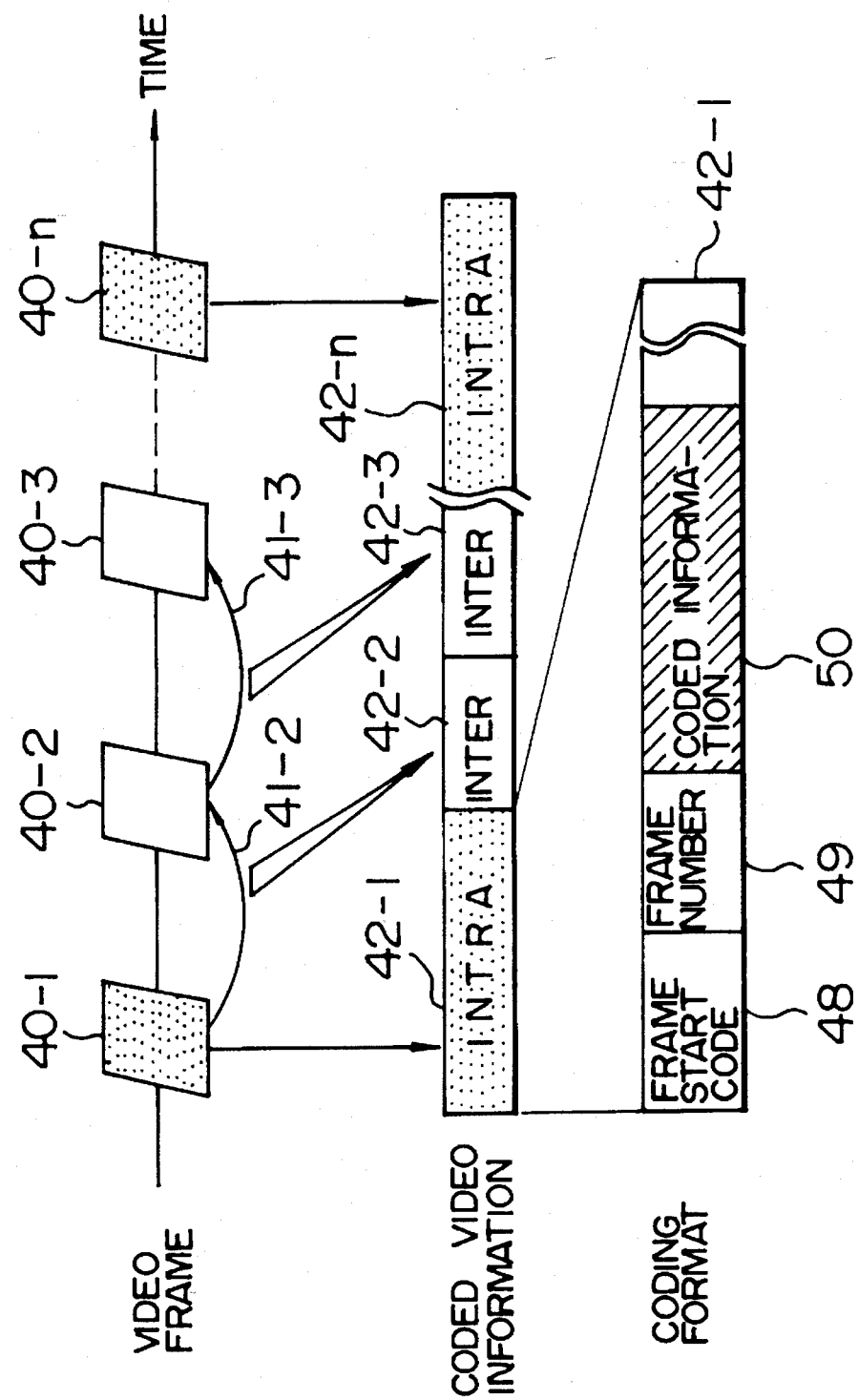
FIG. 5 is a diagram showing the relation between a video frame 40 inputted to a video coder unit 12 of a sending terminal and coded video information 42 outputted therefrom in a first embodiment of the present invention.

FIG. 5 shows the relation between video frames inputted from the video input device 11 and a sequence of coded information outputted by the video coder unit 12. FIG. 5 shows the format of coded information as well.

Blocks 40-1n to 40-n shown along a time axis 41 represent video frames inputted from the video input device 11. Among them, video frames 40-1 and 40-n represented with dot patterns are coded on the basis of only video information of respective frames regardless of other frames, resulting in INTRA frames 42-1 and 42-n.

As for video frames 40-2, 40-3, . . . other than the above described INTRA frames, difference information pieces 41-2, 41-3, . . . between them and respective immediately preceding video frames 40-1, 40-2, . . . are coded, resulting in INTER frames 42-2, 42-3, . . . .

Each of coded frames 42 (42-1, 42-2, . . . ) has a frame start code 48, a frame number 49, and a coded information portion 50. In this example, it is assumed that frame information indicating whether the coded video information is an INTRA frame or an INTER frame is included in the coded information portion 50.

Figure 6:
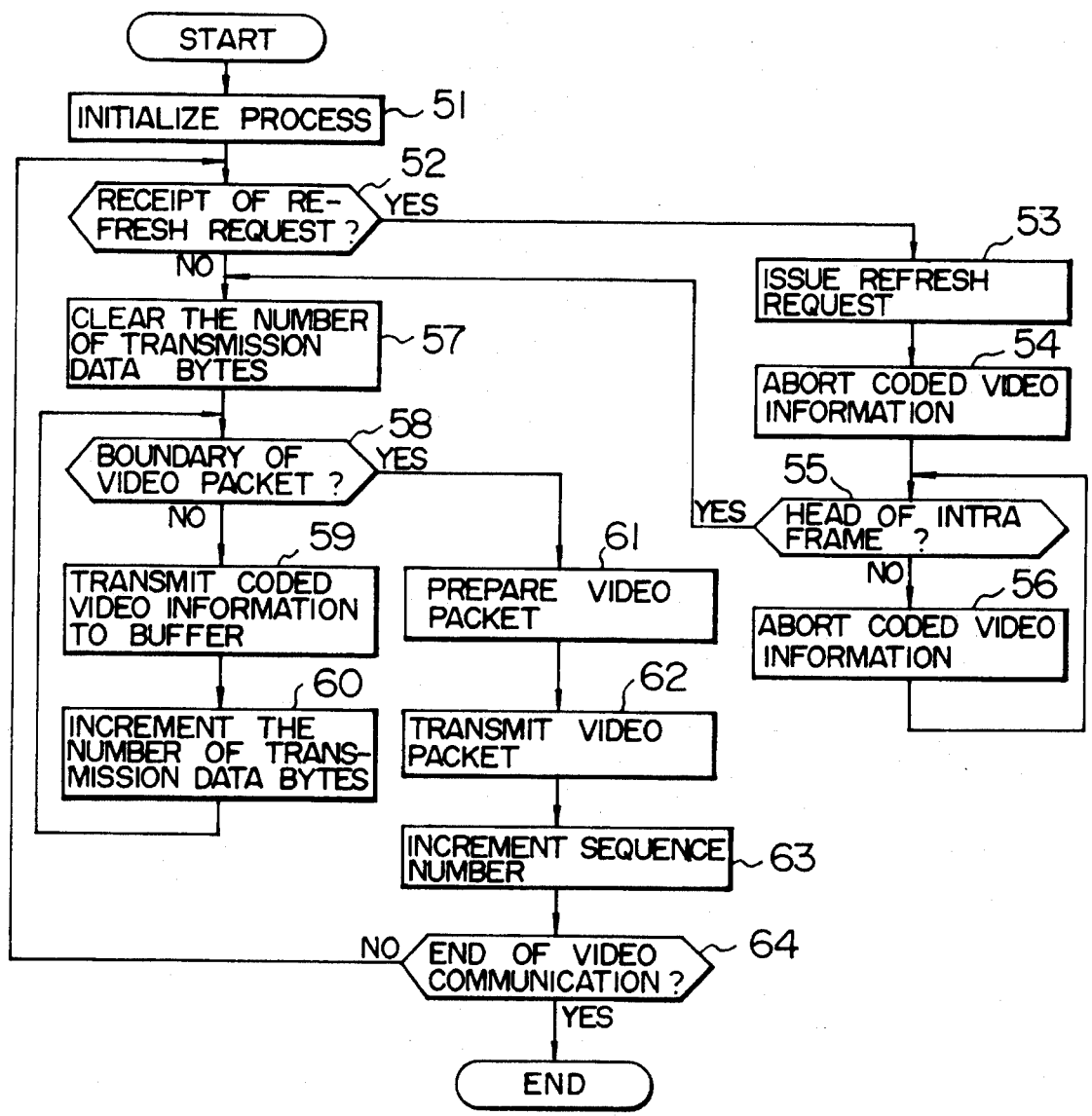
FIG. 6 is a flow chart showing the function of a transmission processing routine of a video communication control program in the first embodiment of the present invention.

Embodiment 1:

FIG. 6 is a flow chart showing a first embodiment of a video transmission control routine, which forms a part of a video communication control program prepared in the memory 13.

After initialize process of video communication (step 51), it is checked whether a refresh request command for the coding sequence has been received from the receiving terminal (step 52). If there are no refresh requests, processing proceeds to step 57. If a refresh request command has been received, a refresh request is issued to the video coder unit 12 (step 53) and coded video information in the FIFO queue 33 is aborted (step 54).

Subsequently, coded video information outputted to the FIFO queue is checked (step 55). If the coded video information does not correspond to the head portion of an INTRA frame, the coded video information is aborted (step 56). If the checked coded video information corresponds to the head portion of an INTRA frame, processing proceeds to step 57.

At step 57, the value of count parameter as to the number of transmission data bytes used for transmission control of coded video information is reset to "0." Then, the number of transmission data bytes and the next transmission data are checked (step 58). If the number of transmission data bytes is less than "500" and the next transmission data is not the head portion of an INTRA frame, or if the next transmission data is the head portion of an INTRA frame and the number of transmission data bytes is "0", one byte of coded video information is transmitted to a buffer area for video packet editing (step 59) Then, "1" is added to the count as to the number of transmission data bytes (step 60), and processing returns to step 58.

If the number of transmission data bytes has reached a predetermined value, such as "500", or if the next transmission data is the head portion of an INTRA frame and the number of transmission data bytes is larger than "0" then a video packet having a predetermined format is prepared so as to include a packet sequence number and identification information such as data type indicating whether coded video information begins from the head of the INTRA frame (step 61). This video packet is transmitted to the communication control unit 14 (step 62). Subsequently, the value of the sequence number is increased, and a value obtained by modulo operation with a predetermined value N as the maximum value is adopted as a new sequence number (step 63). Thereafter, it is checked whether a video communication end request has occurred or not (step 64).

If there is a video communication termination request, this transmission processing routine is terminated. If there is not a video communication termination request, processing returns to step 52. In case a sequence number is not included in the packet format edited at the step 61, the step 63 can be omitted.

Figure 7:
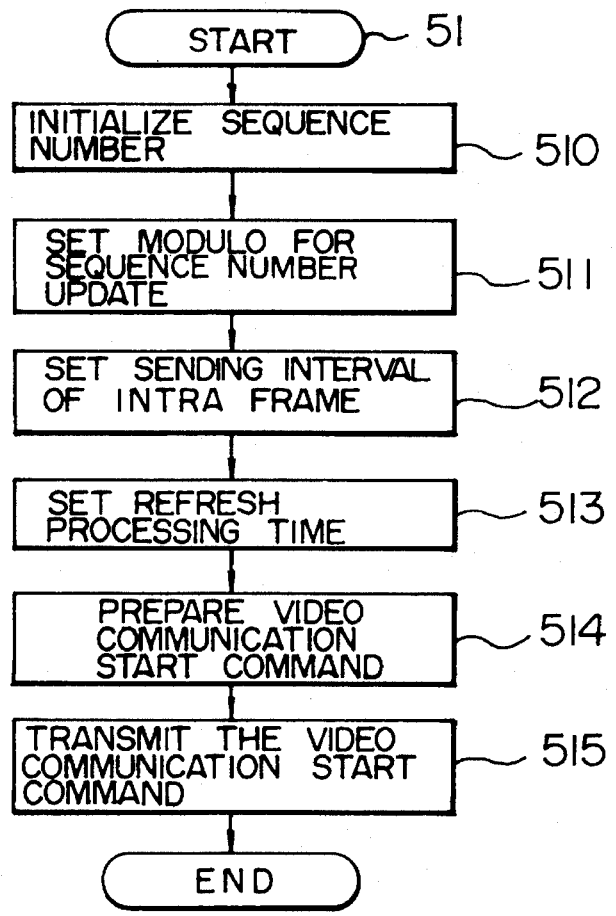
FIG. 7 is a detailed flow chart showing an example of video communication initialize process 51 in FIG. 6.

FIG. 7 shows an embodiment of the video communication initialize process 51 shown in FIG. 6.

In this example, an initial value is set as the sequence parameter (step 510). Then the modulo for sequence number update processing is set (step 511). The sending interval of INTRA frame in the video coder unit 12 is set (step 512). Time required for refresh processing in the video coder unit is set (step 513). Thereafter, a video communication start command including the above described sequence number, modulo, sending interval of INTRA frame, and refresh processing time as data is prepared (step 514). This video communication start command is transmitted to the receiving terminal (step 515).

In this example, a large number of parameter values are set in the video communication start command. Depending upon the method for judging whether a refresh request is required or not, however, a part of these parameters and steps associated with them may be omitted.

Figure 8:
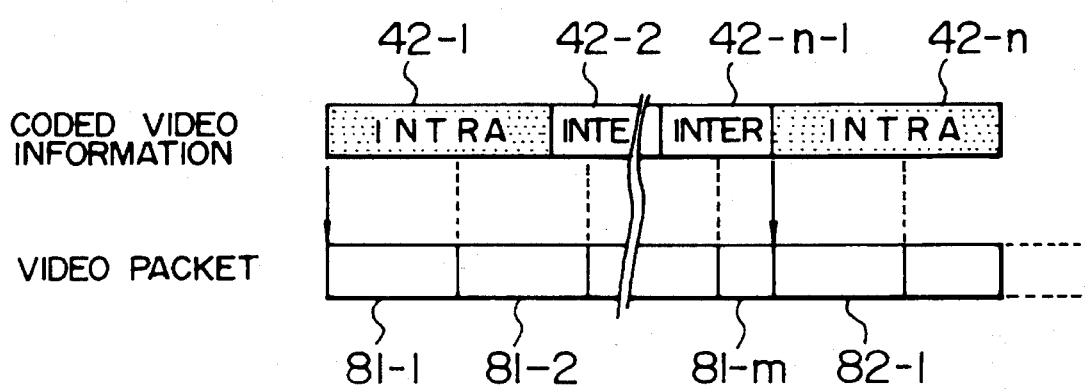
FIG. 8 is a diagram showing the relation between the coded video information 42 outputted from the video coder unit 12 and video packets 81.

FIG. 8 shows the relation between coded video information outputted from the video coder unit and video packets prepared by the processing of the steps 58 to 61 of FIG. 6.

Commencing with the head of an INTRA frame 42-1, coded video information is divided into a plurality of blocks 81-1, 81-2, . . . each having a fixed length. Each block is converted to a video packet.

However, if a fixed-length block is formed in an INTER frame 42-n-1 immediately preceding the next INTRA frame 42-n, the head portion of the next INTRA frame 42-n is included in the fixed-length block. In this case, a variable-length video packet including only the remaining block portion 81-m of the INTER frame 42-n-1 is prepared. From head portion 82-1 of the next INTRA frame 42-n, fixed-length block division is repeated again.

Figure 9:
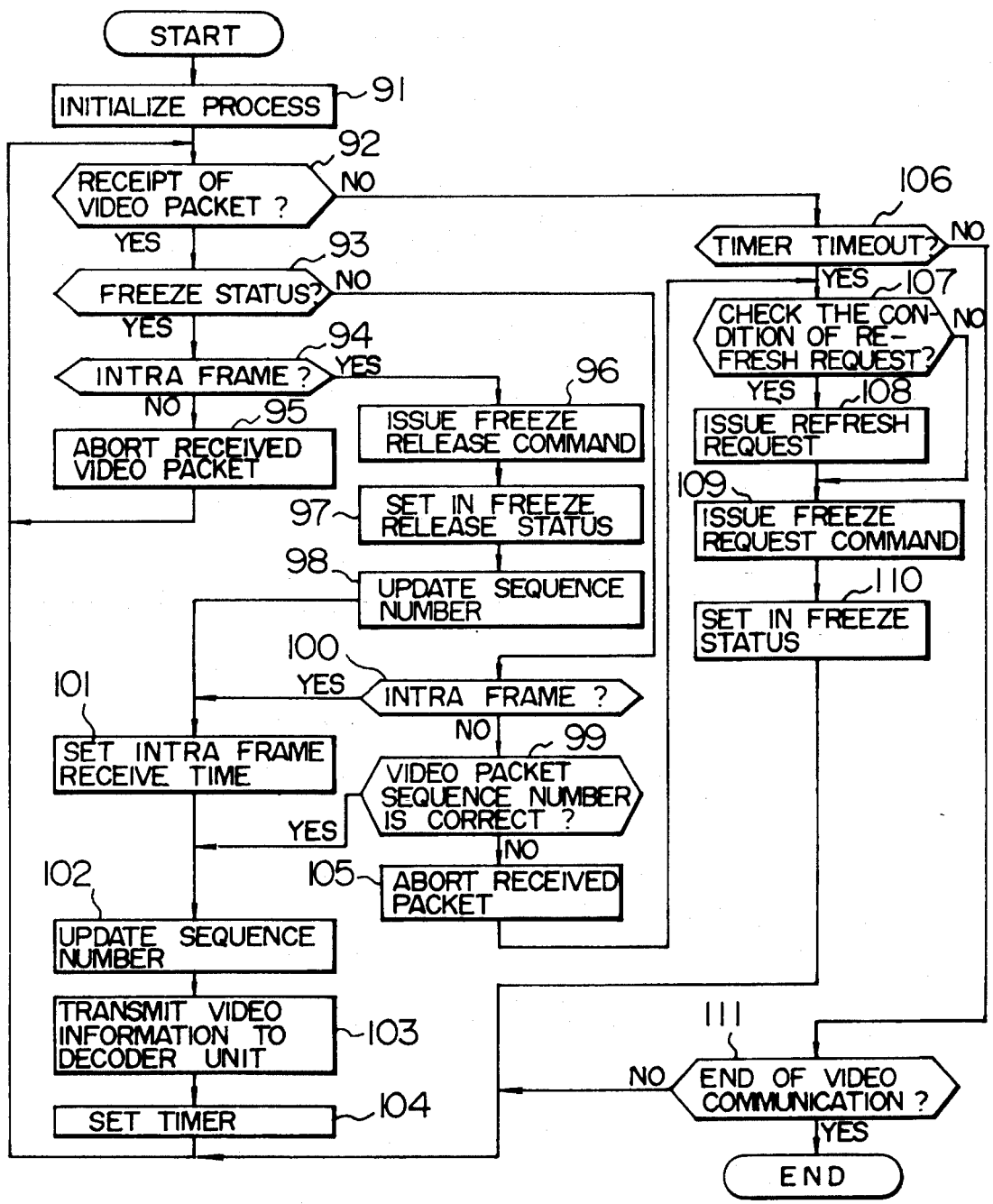
FIG. 9 is a flow chart showing the function of a receiving routine of the video communication control program in the first embodiment of the present invention.

FIG. 9 is a flow chart showing a first embodiment of a video receiving control routine, which forms a part of the video communication control program.

After initialize process of video communication (step 91) has been conducted, it is checked whether a video packet has been received (step 92). If a video packet has been received, it is determined whether the receiving status parameter is in the freeze status (step 93).

If the receiving status parameter is in the freeze status, it is determined whether coded video information included in the received video packet belongs to the head block of an INTRA frame (step 94). If the coded video information does not belong to the head block of the INTRA frame, the received video packet is aborted (step 95).

If the received video packet belongs to the head block of an INTRA frame, a freeze release command is issued to the video decoder unit 15 (step 96). The receiving status parameter is changed to freeze release status (step 97). The value of sequence number set in the received video packet is set in a sequence number parameter for receiving processing control (step 98). Current time is set in INTRA frame receiving time (step 101). Furthermore, one is added to the sequence number set in the received video packet, and a value obtained by modulo operation with a modulo for sequence number update is adopted as a new sequence number for receiving processing (step 102). Coded video information extracted from the received video packet is transmitted to the video decoder unit (step 103). A timer for monitoring the arrival delay of video packet is set again (step 104). Thereafter, processing returns to step 92.

If the receiving status parameter is not in the freeze status when a video packet has been received, processing proceeds from the step 92 to step 100. It is determined whether coded video information of the received video packet belongs to the head block of an INTRA frame. If it belongs to the head block of an INTRA frame, processing of the above described step 102 and succeeding steps is executed. If the received packet is a packet other than the head block of an INTRA frame, the sequence number set in the video packet is compared with the sequence number for receiving processing (step 99). If they are equal with each other, the processing of the step 102 and succeeding steps is executed. If they are not equal, then loss of a video packet is considered to have occurred and the received video packet is aborted (step 105), and processing proceeds to step 107.

If a video packet has not been received at the step 92, it is determined at step 106 whether timeout has been notified by a timer. If timeout has not been notified, it is checked at step 111 whether video communication termination request has occurred. If there has not been a termination request, processing returns to the step 92. If timeout has been notified, expected time of the next INTRA frame of normal mode predicted from the INTRA frame receiving time and sending interval of INTRA frame is compared with expected time of the next INTRA frame of forced mode predicted from the current time and refresh processing time (step 107).

If the force mode is earlier, a refresh request command including a sequence number for receiving processing is prepared and transmitted to the sending terminal (step 108). Thereafter, a freeze request command is issued to the video decoder unit (step 109). After a value indicating the freeze status has been set in the receiving status parameter (step 110), processing returns to step 92.

If the expected time of the next INTRA frame of normal mode is earlier at step 107, processing proceeds to the step 109 without transmitting the refresh request.

In case video communication is performed by using video packets each having a format which does not include a sequence number, or in case a sequence number is not used for receiving processing, steps concerning the sequence number may be omitted in the above described flow chart.

Figure 10:
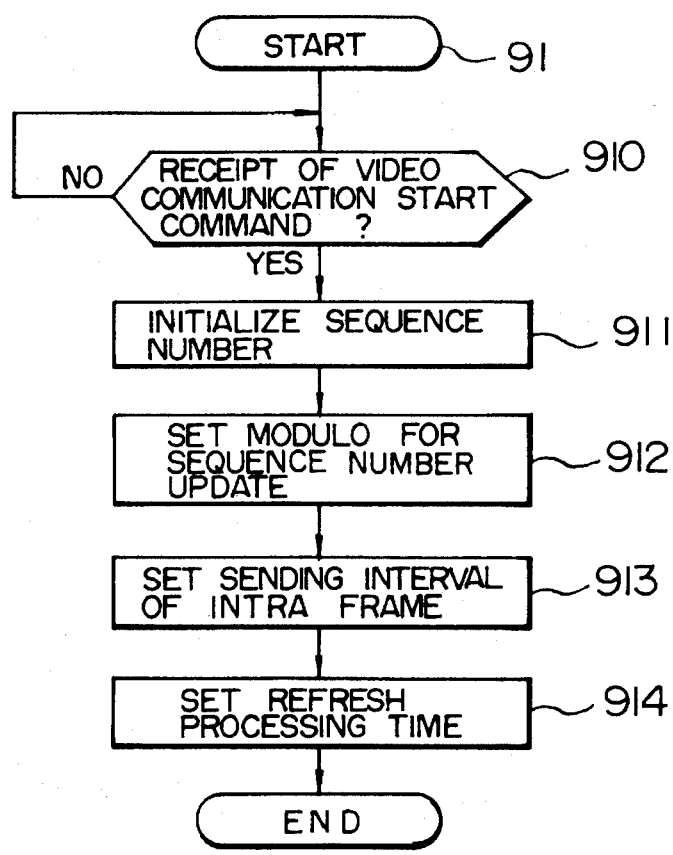
FIG. 10 is a detailed flow chart showing an example of video communication initialize process 91 in FIG. 9.

FIG. 10 shows an embodiment of the video communication initialize process 91 of FIG. 9.

If the video communication start command is received (step 910), an initial value of sequence number specified by the video communication start command is set in the sequence number for receiving processing (step 911). Then a specified modulo for sequence number update is stored (step 912). The sending interval of INTRA frame is stored (step 913). Time required for refresh processing is stored (step 914).

In a variant embodiment, in case some of parameters specified by the above described video communication start command are omitted, steps associated with the omitted parameters are omitted.

Figure 11:
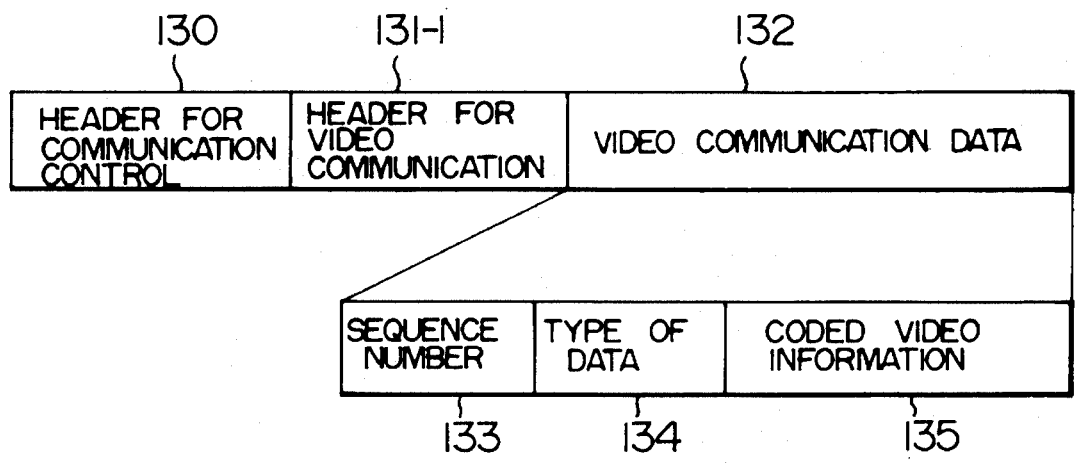
FIG. 11 is a diagram showing an example of a format of video packets.

FIG. 11 shows the configuration of a video packet sent out from the sending terminal.

Numeral 130 denotes a header for communication control used by the communication control unit 14. Numeral 131-1 denotes a header for video communication used by video communication control. A code indicating that this packet is a packet for video information is set in the header 131-1. Numeral 132 denotes a field in which video communication data are set. The data include a sequence number 133, coded video information 135, and a data type code 134 indicating whether the above described coded video information belongs to the head block of an INTRA frame or not.

If information is set in the coded video information 135 in the form of 48 to 50 shown in FIG. 5 and it can be determined whether information of an INTRA frame is included by checking the coded information 50, the above described data type code 134 may be omitted.

Figure 12:
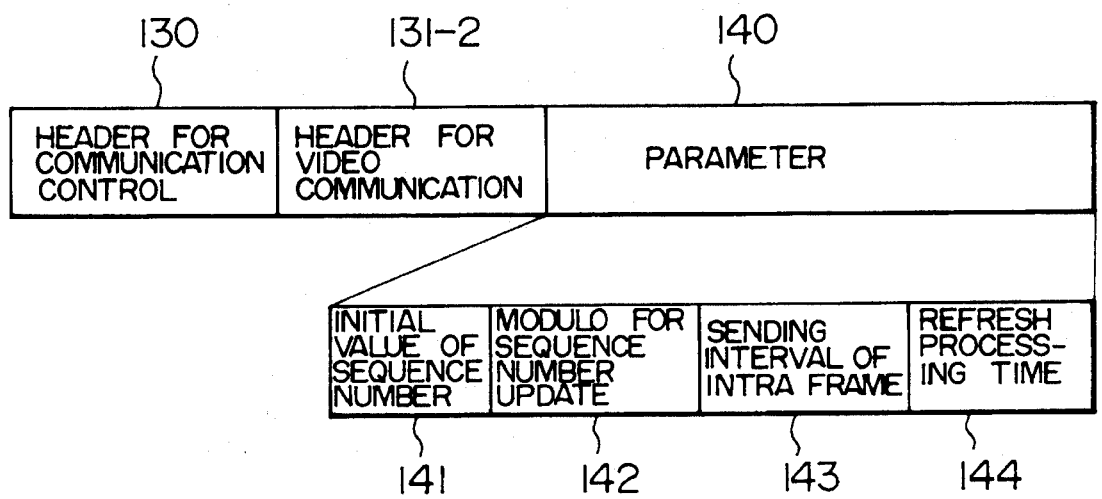
FIG. 12 is a diagram showing an example of a format of a video communication start command.

FIG. 12 shows the configuration of the video communication start command.

Numeral 130 denotes a header for communication control similar to the video packet shown in FIG. 11. Numeral 131-2 denotes a header for video communication similar to the above described 131-1. In this case, a code indicating the video communication start command is set in the header 131-2. Numeral 140 denotes a parameter setting field. An initial value of sequence number 144, a modulo for sequence number update 142, a sending interval of INTRA frame 143, and a refresh processing time 144 are set in the parameter setting field 140.

In a variant embodiment, some of these parameters may be omitted.

Figure 13:
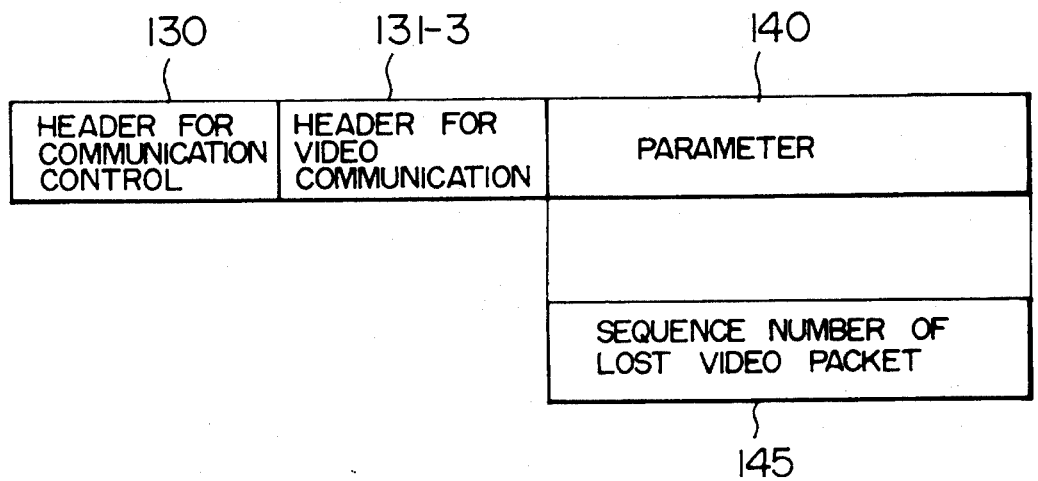
FIG. 13 is a diagram showing an example of a format of a refresh request command.

FIG. 13 shows the configuration of a refresh request command.

In this case, a code indicating a refresh request command is set in a header for video communication 131-3, and the sequence number of the lost video packet is set in the parameter-setting field 140.

Figure 14:
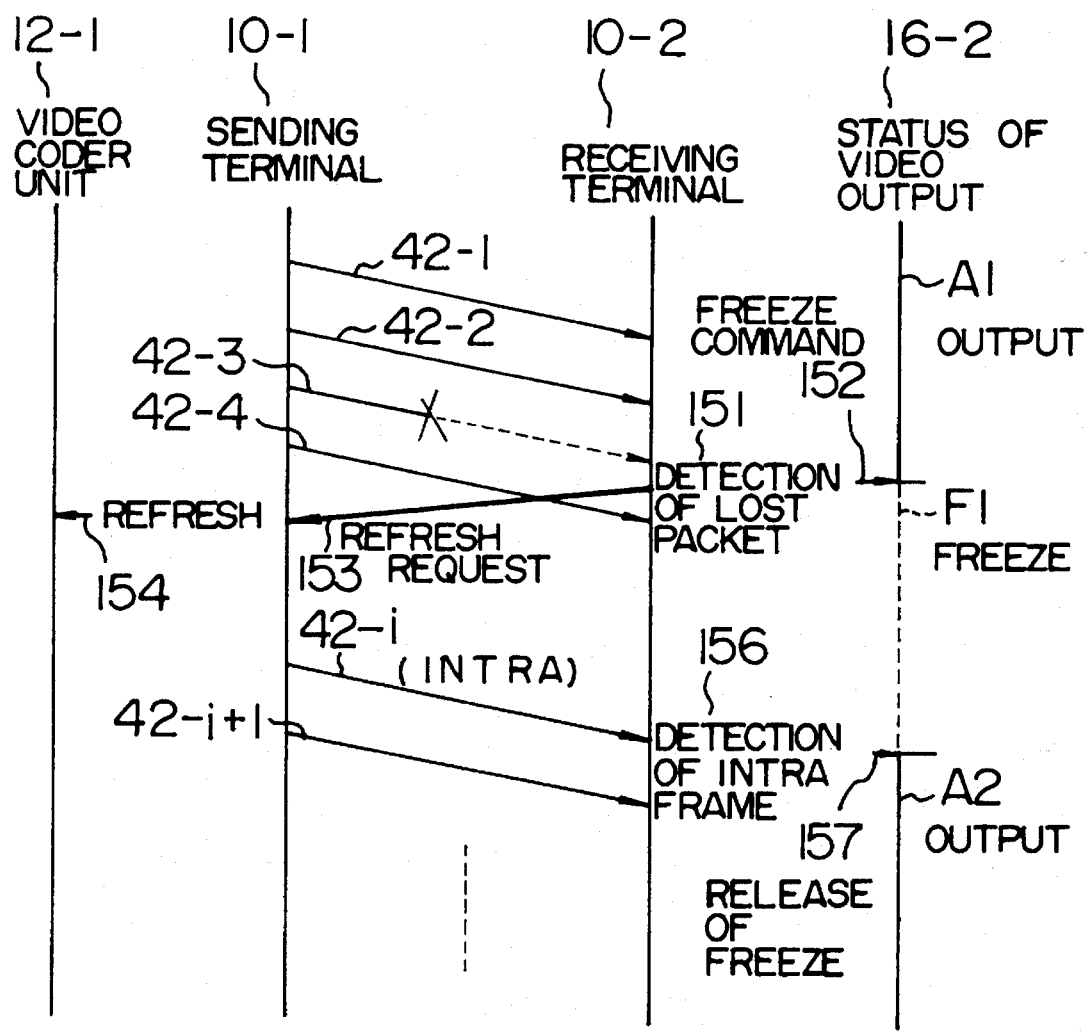
FIG. 14 is a diagram illustrating communication sequence between a sending terminal 10-1 and a receiving terminal 10-2 in the first embodiment.

FIG. 14 shows an example of a video communication sequence realized by the above described video communication control program when a video packet has been lost.

It is now assumed that a terminal device 10-1 is executing video transmitting processing and a terminal device 10-2 is executing video receiving processing. Numeral 12-1 denotes a video coder unit of the terminal device 10-1. Numeral 16-2 denotes the video output status in the video decoder unit and the display device of the terminal device 10-2. While video packets 42-1 and 42-2 are being received normally, the video output of the receiving terminal is in the normal output status A1.

If the receiving terminal 10-2 detects the loss of a video packet 42-3 (151), then a freeze request command is issued to the video decoder unit (152) and the video output status is brought into the freeze status F1. At this time, a refresh request command 153 is transmitted to the sending terminal. Until a video packet including the head block of an INTRA frame is received, received video packets 42-4, . . . are aborted.

Upon receiving the refresh request command 153, the sending terminal 10-1 issues a refresh request 154 to the video coder unit 12-1. In response thereto, the video coder unit conducts refresh processing. Therefore, a video packet 42-i including the head block of an INTRA frame and succeeding video packets 42-i+1, are successively transmitted from the sending terminal.

Upon receiving the video packet 42-i of the head block of an INTRA frame, the receiving terminal 10-2 issues the freeze release command to the video decoder unit (157). Thereby, the video output of the receiving terminal is restored to the normal output status A2.

According to the present embodiment, a video packet of an INTRA frame is transmitted from the sending terminal in response to a refresh request fed from the receiving terminal which has detected arrival delay or loss of a video packet. As compared with the conventional system in which reception of a video packet of an INTRA frame is waited in the natural status, therefore, video output can be rapidly restored to the normal status.

Figure 15:
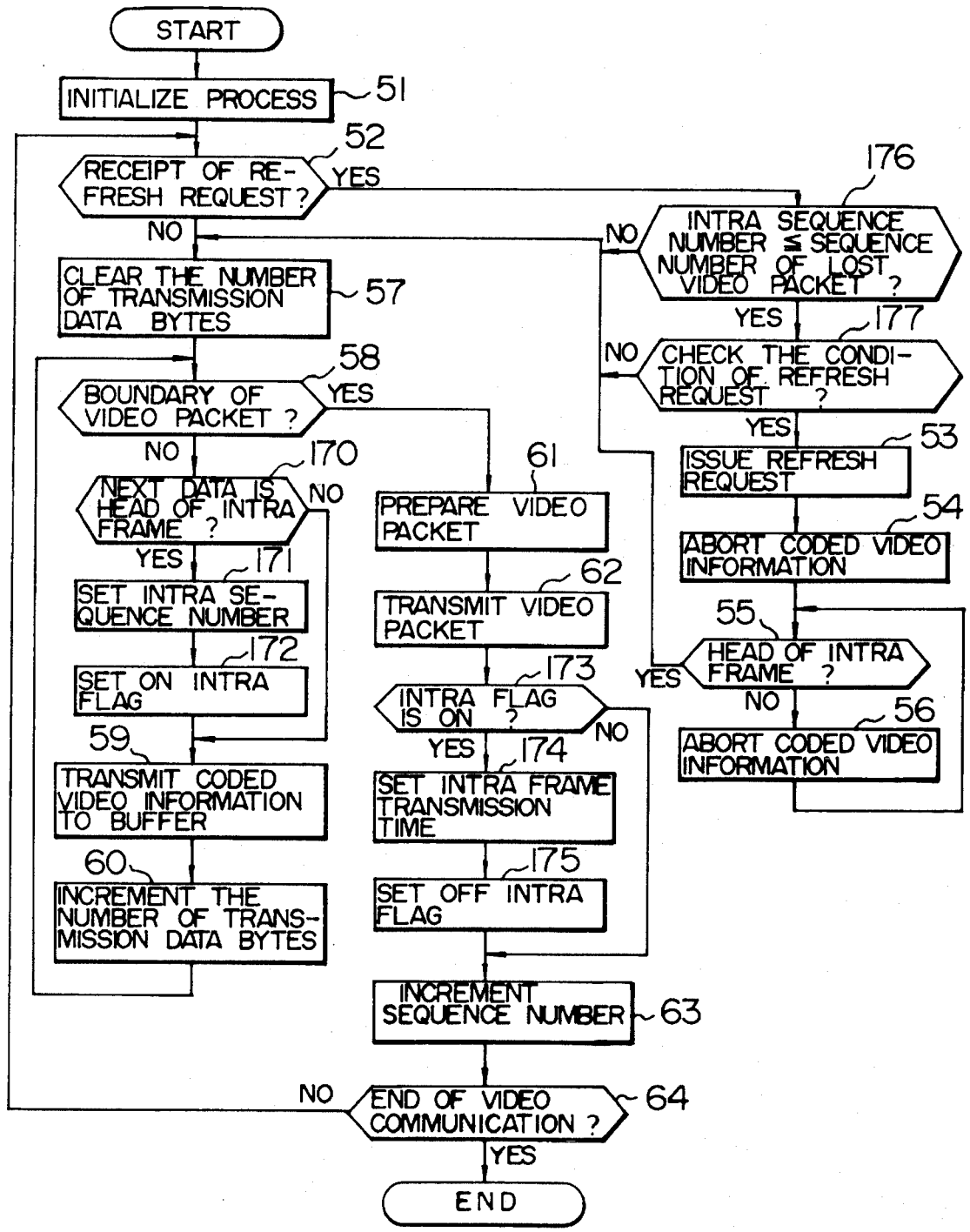
FIG. 15 is a flow chart showing the function of a receiving routine of a video communication control program in a second embodiment of the present invention.

Embodiment 2:

FIG. 15 is a flow chart showing a second embodiment of the video transmission control routine.

In this embodiment, the sending terminal transmits video packets each provided with a sequence number. The receiving terminal issues a refresh request command in a form specifying the sequence number of a lost video packet. On the basis of the value of the above described notified sequence number, the sending terminal judges whether refresh operation should be executed or not.

In FIG. 15, steps 51 to 64 represent the same contents as those of the first embodiment shown in FIG. 6. Steps 170 to 177 are newly added portions.

Prior to the byte transmission of video information to the video packet edit area (step 59), it is checked at step 170 whether the next transmitted data is the head portion of an INTRA frame. If the next transmitted data is not the head portion of an INTRA frame, processing proceeds to the step 59 for byte transmission to the buffer area. If the next transmitted data is the head portion of an INTRA frame, then the value of the sequence number parameter is set in an INTRA sequence number (step 171), an INTRA flag is turned ON (step 172), and thereafter the byte transmission step 59 is executed.

After a video packet has been transmitted (step 62), the status of the INTRA flag is checked (step 173). In case of the OFF status, processing proceeds to the sequence number increase step 63. If the INTRA flag is in the ON status, then current time is set as INTRA frame transmission time at step 174, and thereafter the INTRA flag is returned to the OFF status (step 175), and the sequence number increase step 63 is executed.

If a refresh request command has been received (step 52), then the sequence number of the lost video packet set in the above described refresh request command is compared with the INTRA sequence number stored by itself (step 176) before a refresh request is issued to the video coder unit (step 53). If the INTRA sequence number is larger than the sequence number of the lost video packet, the video packet of the head block of the INTRA frame has already been transmitted. In this case, therefore, the above described refresh request command is disregarded and processing returns to the step 57.

If the INTRA sequence number is equal to or less than the sequence number of the lost video packet, then expected time of the next INTRA frame of normal mode predicted from the INTRA frame transmission time and sending interval of INTRA frame is compared with expected time of the next INTRA frame of forced mode predicted from the current time and refresh processing time to determine whether refresh operation should be executed (step 177).

If the expected time of the next INTRA frame of normal mode is earlier, processing returns to the step 57 without conducting the refresh processing. Only when the expected time of the next INTRA frame of forced mode is earlier, refresh processing (step 53) is executed.

Figure 16:
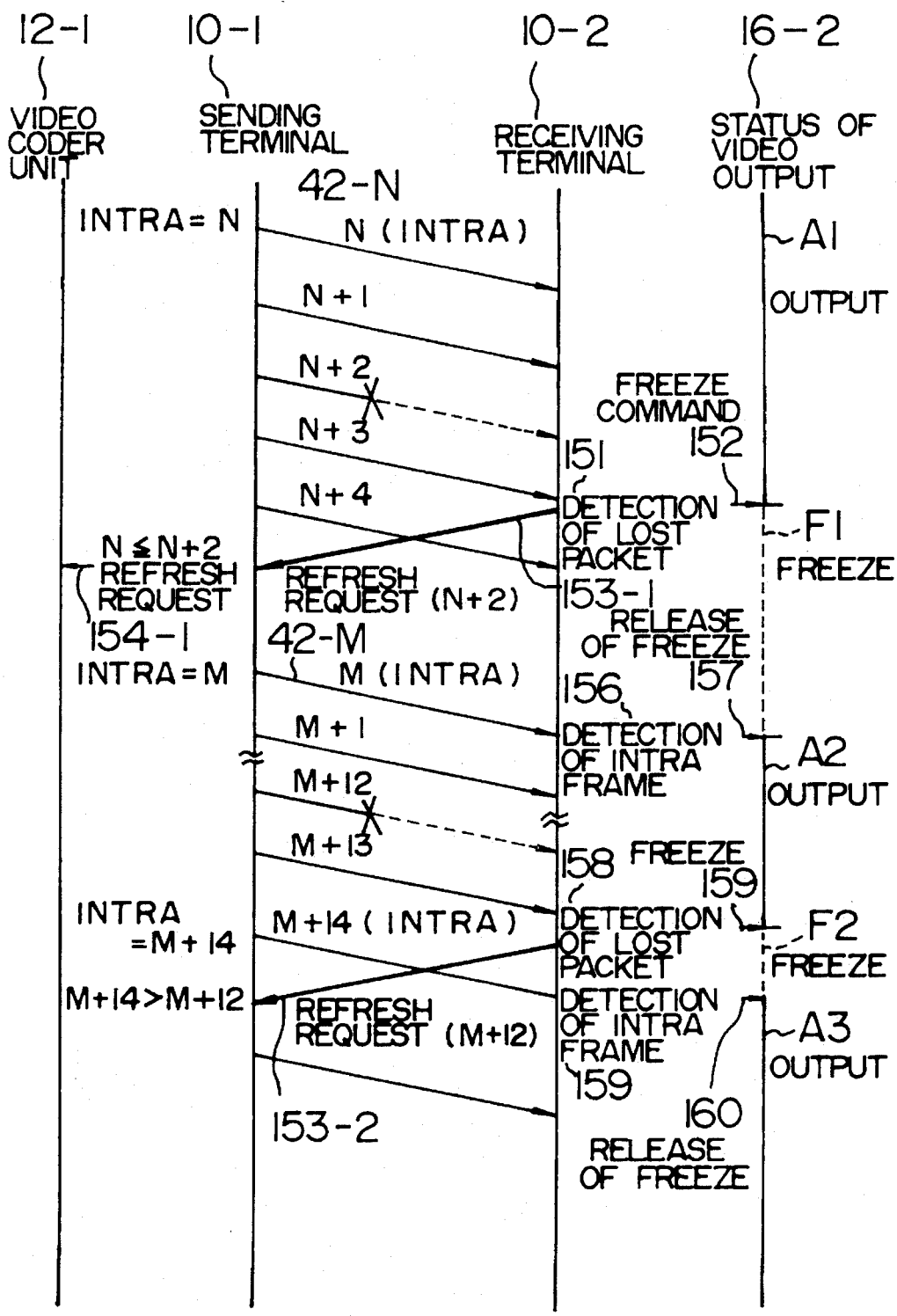
FIG. 16 is a diagram illustrating a communication sequence between a sending terminal 10-1 and a receiving terminal 10-2 in the second embodiment.

FIG. 16 shows an example of a video communication sequence in case loss of a video packet has occurred in the second embodiment.

When the INTRA sequence number is "N" in the sending terminal 10-1, video packets 42-N, 42-N+1, ... respectively having packet sequence numbers N, N+1, N+2, ... are sent out one after another. While these packets are being received normally, the status 16-2 of video output of the receiving terminal 10-2 is in the output status A1.

Assuming now that a video packet having a sequence number "N+2" is lost, the receiving terminal which has detected the loss of the packet from the loss of continuity of sequence number (151) issues a freeze request command to the video decoder unit 16-2 (152-1) and brings the video output status into a freeze status F1. In addition, the receiving terminal transmits a refresh request command 153-1 having the sequence number "N+2" of the lost video packet set therein to the sending terminal. Any video packet received thereafter is aborted so long as it is not a video packet of the head block of an INTRA frame.

Upon receiving the above described refresh request command 153-1, the sending terminal 10-1 compares the value "N" of INTRA sequence number stored by itself with the value "N+2" of the sequence number of the lost video packet notified by the receiving terminal. Since N≦N+2, the sending terminal 10-1 issues a refresh request 154-1 to the video coder unit 12-1.

Upon the end of the refresh processing, the sending terminal stores an updated INTRA sequence number "M" and successively transmits a video packet of an INTRA frame head block having a packet sequence number M and video packets of succeeding INTER frames.

Upon receiving the above described video packet 42-M of the INTRA frame (156), the receiving terminal 10-2 issues a freeze release command 157 to the video decoder unit 15-2 and restarts video decoding processing for succeeding received packets. As a result, the video output status of the receiving terminal is restored to the output status A2.

Assuming now that loss of a video packet having a sequence number M+12 has been detected (158) thereafter, the receiving terminal issues the freeze request command to the video decoder unit 15-2 again (159) and the video output status is changed to a freeze status F2. At the same time, the receiving terminal transmits a refresh request command 153-2 having the sequence number M+12 of the lost video packet set therein to the sending terminal.

It is now assumed that the sending terminal has transmitted a video packet of the head block of an INTRA frame having a sequence number M+14 immediately before the sending terminal receives the above described refresh request command 153-2. In this case, the value of the stored INTRA sequence number has been updated to have "M+14".

When the sending terminal has received the above described refresh request command 153-2, the sending terminal compares the value "M+14" of the stored INTRA sequence number with the notified sequence number "M+12" of the lost video packet. Since M+14>M+12, the refresh request is disregarded.

On the other hand, the receiving terminal receives the video packet of the head block of the INTRA frame having the sequence number M+14 (159) immediately after the refresh request. Therefore, the receiving terminal issues a freeze release command to the video decoder unit (160) and restarts decoding processing for packets received thereafter. As a result, the video output status is restored to the output status A3 again.

According to the present embodiment, in case a video packet of an INTRA frame has already been transmitted after the lost video packet was transmitted, wasteful refresh processing in response to the refresh request sent from the receiving terminal can be omitted.

Figure 17:
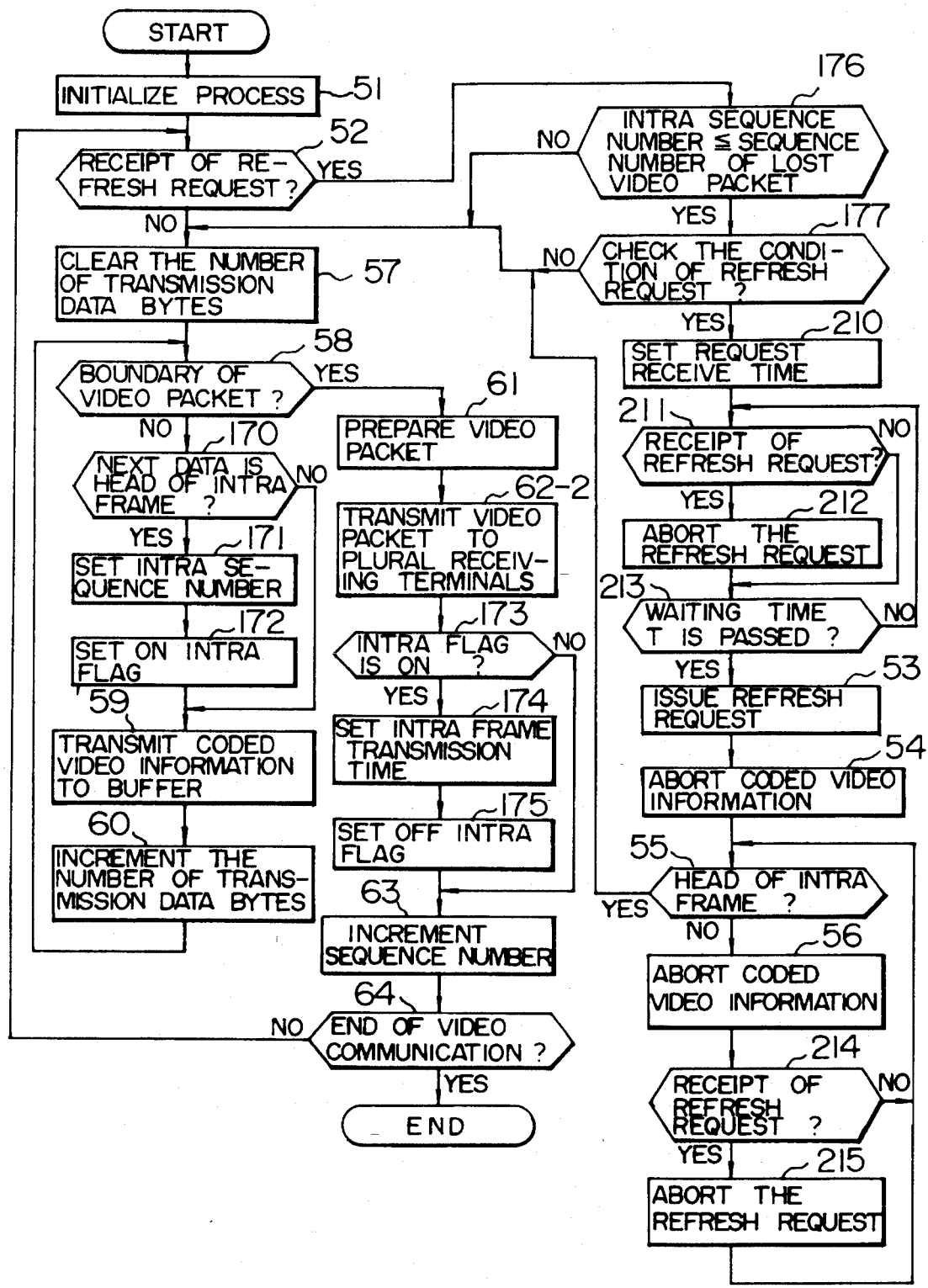
FIG. 17 is a flow chart showing the function of a receiving routine of a video communication control program in a third embodiment of the present invention.

Embodiment 3:

FIG. 17 is a flow chart showing a third embodiment of the video transmission control routine.

In this embodiment, the sending terminal transmits the same video image simultaneously to a plurality of terminal devices. Steps having the same contents as those of the flow chart of the second embodiment shown in FIG. 15 are denoted by like numerals. Processing portions peculiar to the present embodiment will hereafter be described.

After a video packet has been prepared at step 61, the same video packet is transmitted to a plurality of terminals under communication (step 62-2). If a refresh request is received from some of receiving terminals and it is determined at step 177 to accept the refresh request, current time is set in the refresh request receiving time parameter and it is stored (step 210). Thereafter, receiving another refresh request command is waited until a predetermined receiving waiting time T of a refresh request command has elapsed. Refresh request commands received during this time are aborted (steps 211 to 213).

If the above described waiting time T has elapsed, then a refresh request is issued to the video coder unit (step 53) and useless coded information in the FIFO queue is aborted (steps 54 to 56). In the course of this abortion processing of coded information, it is confirmed whether a new refresh request command has been received (step 214). If a new refresh request command has been received, it is aborted (step 215).

Figure 18:
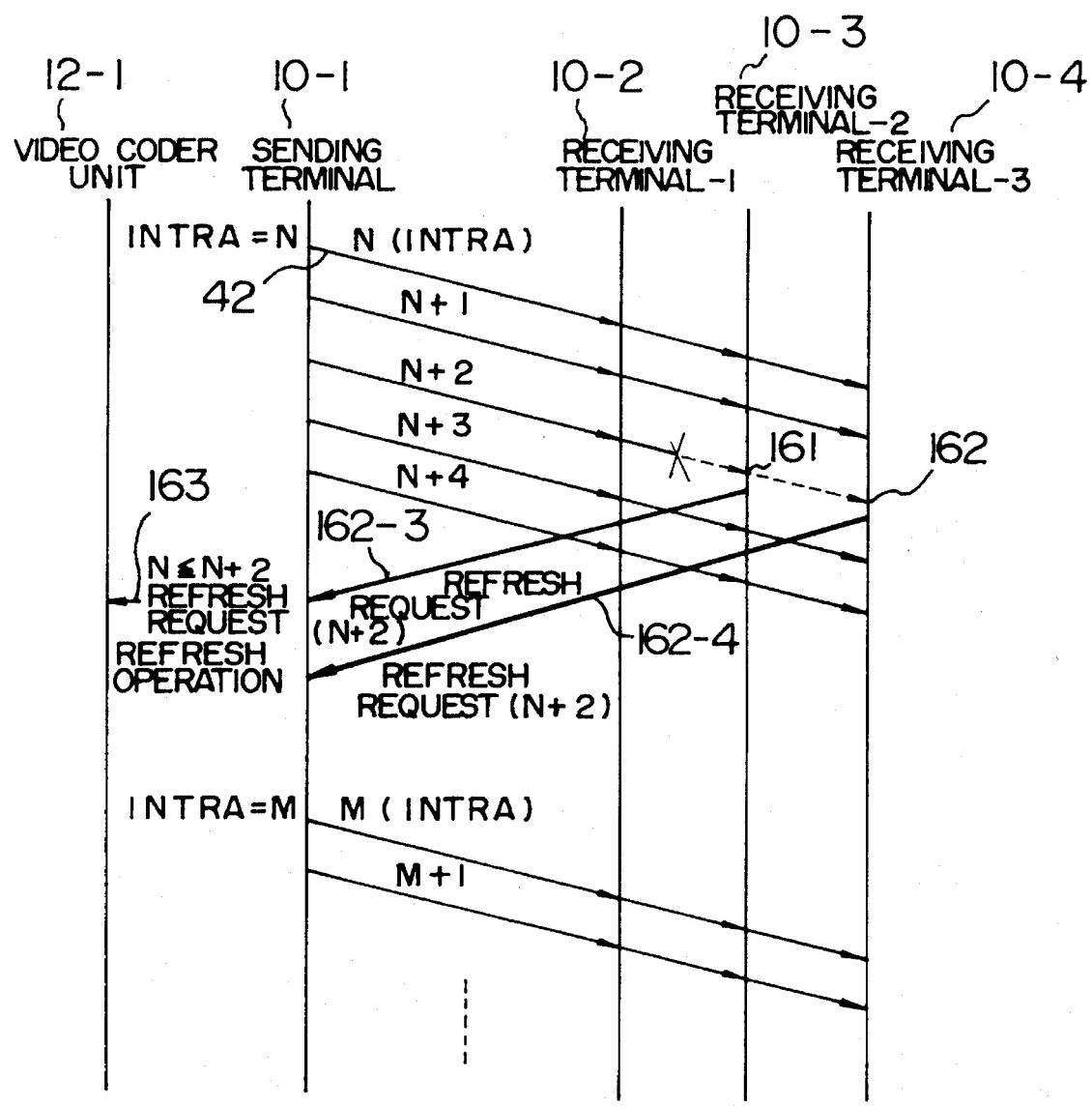
FIG. 18 is a diagram illustrating a communication sequence between a sending terminal 10-1 and a receiving terminal 10-2 in the third embodiment.

FIG. 18 shows an example of communication sequence between terminal devices in the above described third embodiment. It is now assumed that the sending terminal 10-1 communicates with three receiving terminals 10-2 to 10-4.

It is now assumed that the value of the INTRA sequence number is "N" and the sending terminal 10-1 is transmitting video packets having packet sequence numbers N, N+1, N+2, .... If the receiving terminals 10-3 and 10-4 detect loss of the video packet having a sequence number N+2 (161, 162), refresh request commands 162-3 and 162-4 having the sequence number "N+2" of the above described lost video packet set therein are transmitted to the sending terminal.

At the time when the sending terminal 10-1 receives the refresh request command 162-3 which has arrived earlier, the sending terminal 10-1 compares the INTRA sequence number "N" stored by itself with the notified sequence number "N+2" of the lost video packet. Since the relation N≦N+2 holds true, the sending terminal 10-1 issues a refresh request to the video coding unit and a refresh operation status is caused (163). If the sending terminal 10-1 has received the refresh request command 162-4 in this refresh processing state, the sending terminal disregards the refresh request command received later. After the refresh processing has been terminated, the sending terminal 10-1 stores the value M of updated INTRA sequence number. In addition, the sending terminal transmits a series of video packets which begin with the video packet of the INTRA frame having the sequence number M to the receiving terminals 10-2 to 10-4.

According to the present embodiment, the number of times of execution of refresh processing can be suppressed to a minimum for a plurality of refresh requests caused by loss of the same video packet by disregarding refresh requests received while refresh processing is being conducted.

Embodiment 4:

In the video coder unit shown in FIG. 3, the coder 21 codes video information inputted from the video input device 11 into an INTRA frame and a plurality of succeeding INTER frames, and inputs coded data successively to the FIFO queue 22.

In the present embodiment, the coder 21 has an image memory corresponding to a plurality of frames, and the coder 21 has a coding function of generating video packets of INTER frames and INTRA frames on the basis of difference information of a plurality of video frames preceding and succeeding them. The signal processor 26 inputs coded video information to the FIFO queue 22 by taking a video frame as the unit and stores, in the interface register 23, coding type and data length of coded video data stored in the FIFO queue 22. Coded video information is inputted to the FIFO queue 22 in a form of inputting the next coded video information when all data stored in the FIFO queue have been read out.

Figure 19:
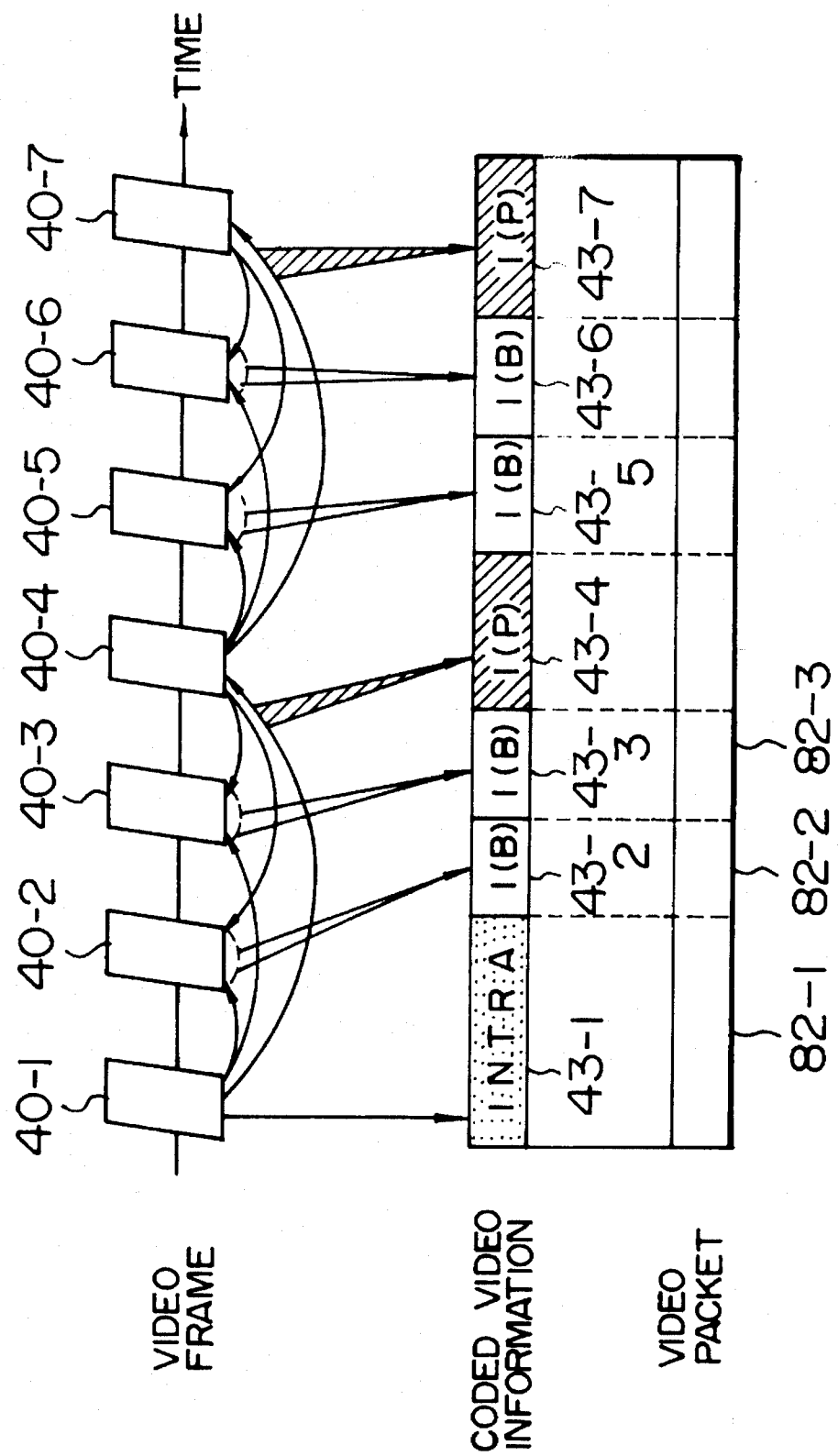
FIG. 19 is a diagram showing relations among video frames 40, coded video information 43, and video packets 82 in a fourth embodiment of the present invention.

FIG. 19 shows relations among video frames 40 (40-1, 40-2, ...) inputted from the video input device 11, coded video information 43 (43-1, 43-2, ...) including a plurality of kinds of INTER frames outputted by the video coder unit 12, and video packets 82 (82-1, 82-2, ...).

In this example, there are two kinds of INTRA frame coding.

According to a first coding, an INTRA frame 43-1, for example, is generated by coding one video frame 40-1.

According to a second coding, an I(P) frame 43-4, for example, is generated by coding difference information between an input video frame 40-4 and the video frame 40-1 associated with a preceding INTRA frame 43-1.

In the same way as the foregoing description, an I(P) frame 43-7 is also generated by coding difference information between an input video frame 40-7 and the video frame 40-1 associated with the preceding INTRA frame 43-4.

INTER frames I(B) 43-2, 43-3, 43-5 and 43-6 are coded on the basis of correlation between each inputted video frame and two video frames associated with preceding and succeeding INTRA frames. For example, I(B) 43-2 is obtained by coding difference information among the inputted video frame 40-2, the inputted video frame 40-1 associated with the preceding INTRA frame 43-1, and the inputted video frame 40-4 associated with the INTRA frame 43-4 generated thereafter. In the same way, I(B) 43-3 is obtained by coding difference information among the inputted video frames 40-3, 40-1, and 40-4.

In the present embodiment, coded data of INTRA frames and INTER frames thus generated are formed as video packets by handling the whole of each frame as one block. That is to say, each of video packets 82-1, 82-2, ... has a frame as the unit.

Figure 20:
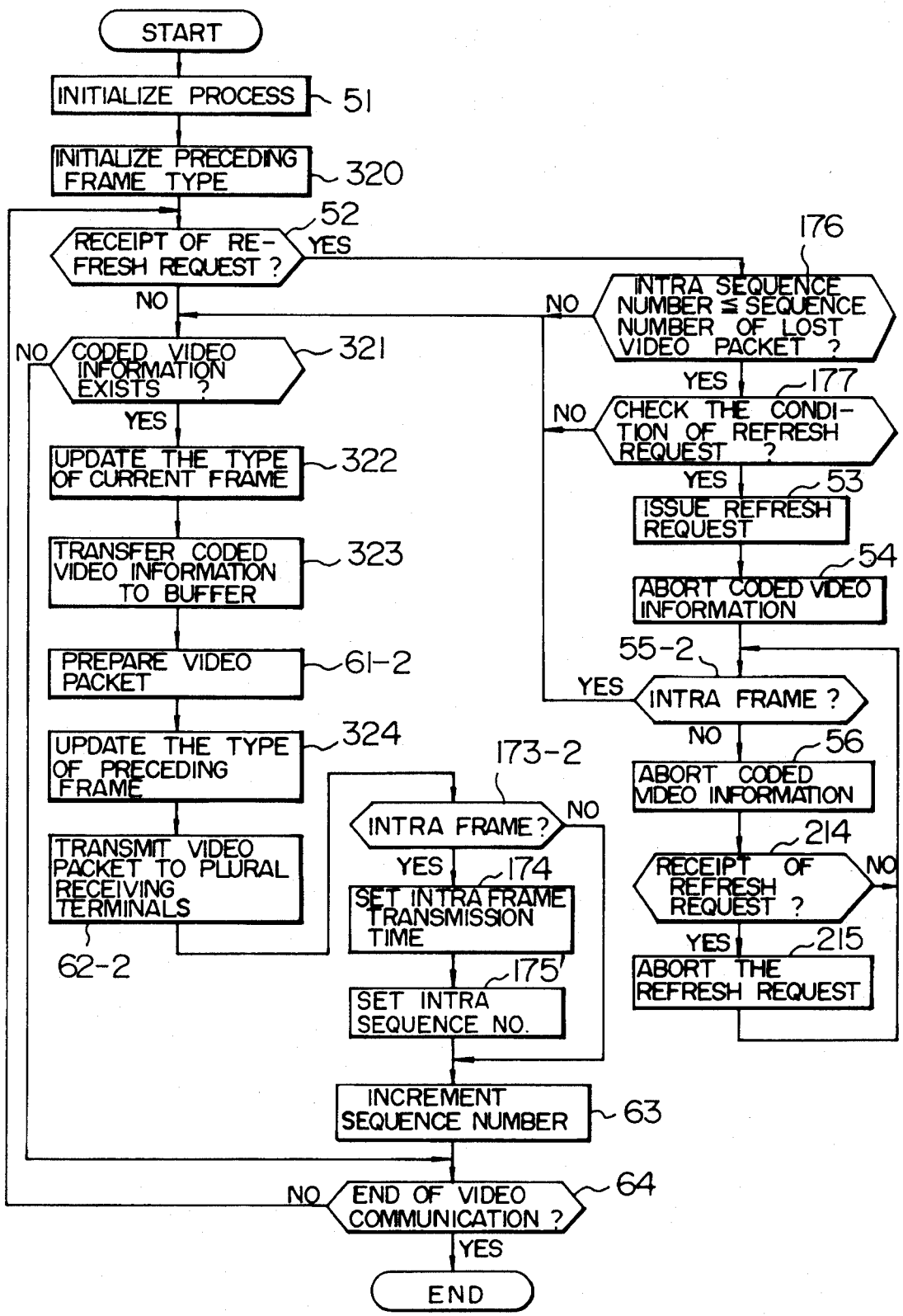
FIG. 20 is a flow chart showing the function of a transmitting routine of a video communication control program in a fourth embodiment of the present invention.

FIG. 20 shows a flow chart of a transmission portion of video communication control in case video packets of the above described form are adopted. Steps having the same contents as those of FIG. 17 are denoted by like numerals and will not be described. In FIG. 20, the receiving terminal judges whether a refresh request is required or not depending upon contents of the lost video packet and a video packet received subsequently.

Referring to FIG. 20, the value of a parameter identifying the coding type of the preceding frame is initialized (step 320) in the wake of the initialize process (step 51). If a refresh request command has not been received at step 52, it is checked whether coded video information has been inputted to the FIFO queue 22 of the video coding unit 22 or not (step 321).

Figure 22:
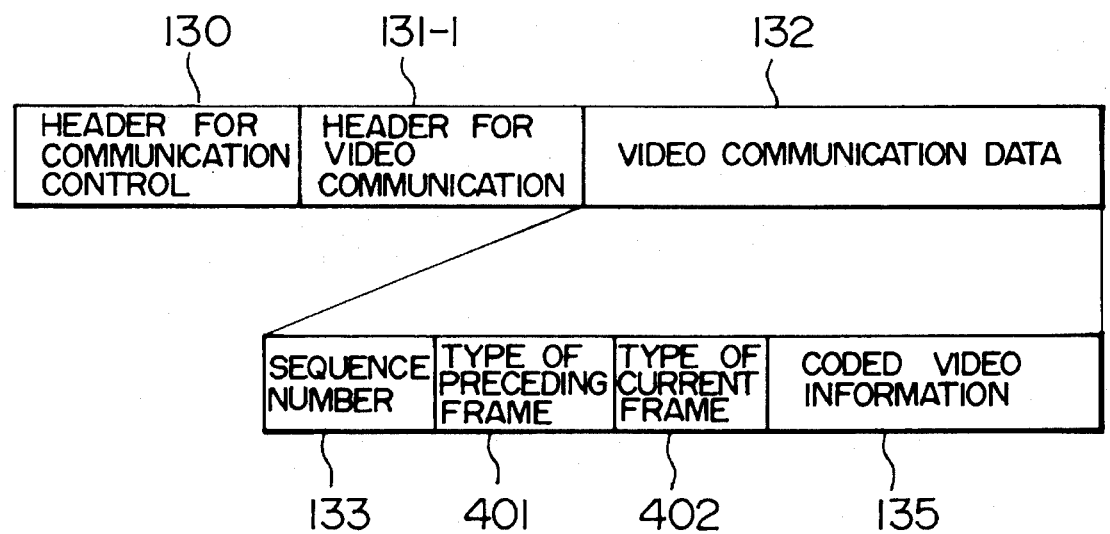
FIG. 22 is a diagram showing a format of video packets in the fourth embodiment of the present invention.

If coded video information has not been inputted, processing proceeds to step 64 for checking the end of video processing. If coded video information has been inputted, the coding type of the coded video information in the FIFO queue is stored in a current frame type parameter (step 322). Every coded video information read out from the FIFO queue is transmitted to a work buffer (step 323). As shown in FIG. 22, a video packet is prepared by setting a sequence number 133, a preceding frame type 401, a current frame type 402, and coded video data 135 in a video communication data field 132 (step 61-2).

Subsequently, coding type stored as the above described current frame type parameter is set in the preceding frame type parameter (step 324). The video packet is transmitted to a plurality of receiving terminals. Thereafter, it is judged from the current frame type parameter whether the frame is an INTRA frame or not (step 173-2). In case of an INTRA frame, the transmission time and the INTRA sequence number are updated (steps 174 and 157').

When refresh processing is conducted upon receiving a refresh request from a receiving terminal, it is judged at step 55-2 whether coded video information in the FIFO queue is an INTRA frame or not.

Figure 21:
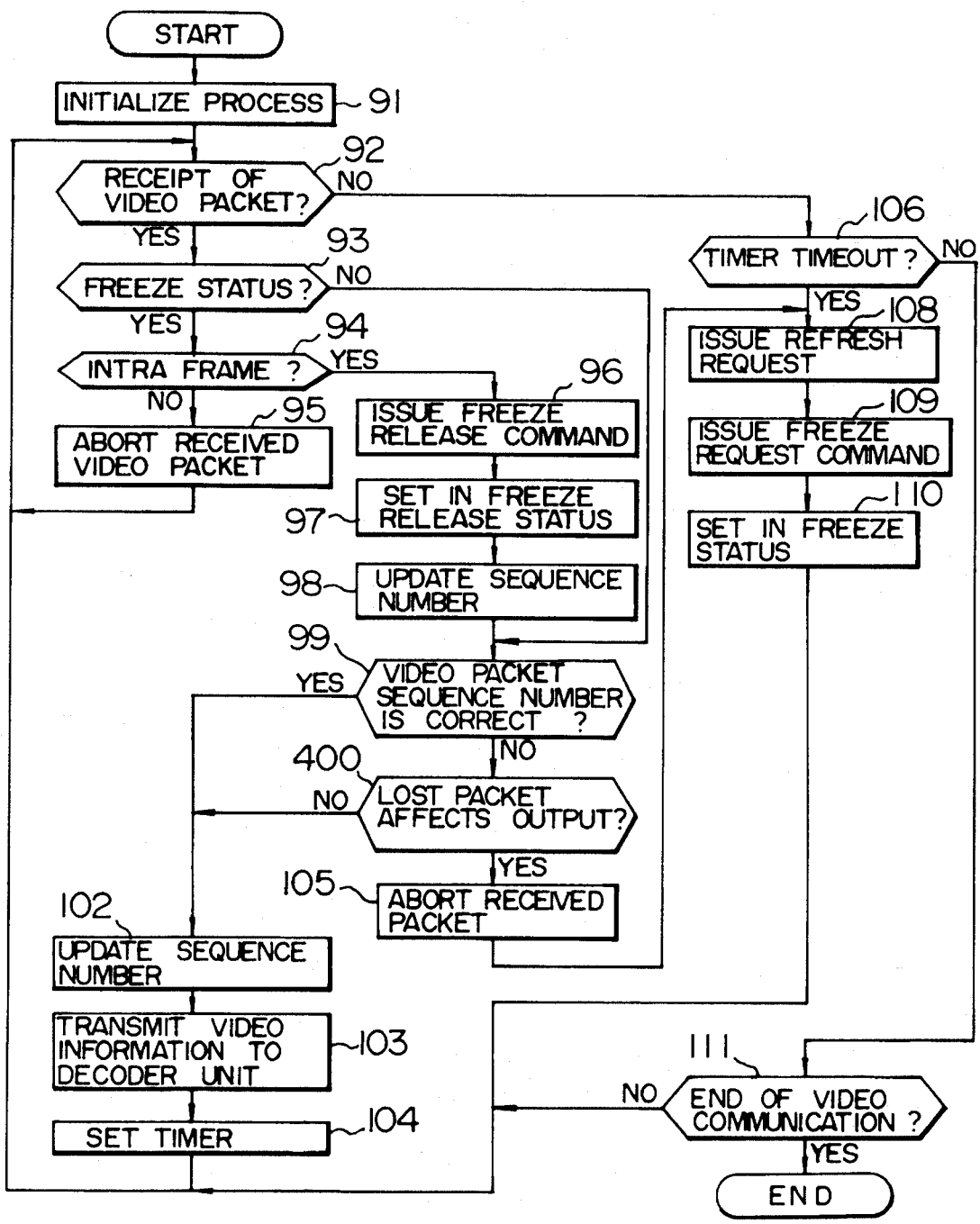
FIG. 21 is a flow chart showing the function of a receiving routine of a video communication control program in the fourth embodiment of the present invention.

FIG. 21 shows a flow chart of receiving processing in a receiving terminal. Steps having the same contents as those of the above described flow chart of FIG. 9 are denoted by like numerals and will not be described.

In case a video packet is received and judged not to be in freeze status (step 93) and in case a video packet of an INTRA frame is received in the freeze status and a series of processing steps (steps 96 to 98) attendant upon freeze release is finished, the sequence number of the video packet is compared with the stored sequence number (step 99).

In case of noncoincidence, the frame type of the received video packet is checked at a decision step 400. If the type of the preceding frame is an INTRA frame or an INTER (P) frame and the type of the current frame is an INTER (B) frame or an INTER (P) frame, then video outputting is judged to become impossible under the influence of coded video information of the lost video packet and abortion of the video packet (step 105) and succeeding refresh request processing (step 108) are conducted.

If at the above described decision step 400 the type of the preceding frame indicated by the received video packet is an INTER (B) frame or the type of the current frame is INTRA frame, then it is judged that the coded video information of the lost video packet exerts no influence and processing for receiving the next video packet of the step 102 and succeeding steps is executed.

In case a video packet has been lost and video reproduction is not affected thereby, the present embodiment makes it possible to realize a video communication system without requiring wasteful refreshing.

In a variant of the present invention, the communication control unit 14 of the video communication terminal shown in FIG. 2 is configured to support simultaneously a plurality of communication protocols such as TCP/IP protocol and UDP/IP protocol. Transmission of video packets in the flow charts of FIGS. 6 and 17 is performed by using the UDP/IP protocol. Transmission of control information such as the video communication start command of FIG. 12 or the refresh request command of FIG. 13 is performed by using the TCP/IP protocol.

By using protocols properly, occurrence of arrival delay of video packets is prevented. Even if arrival delay or loss of a video packet should occur, video outputting can be rapidly restarted.

In case a video packet has been lost in the course of video communication, the sending terminal conducts refresh operation for video coding in response to a request sent from a sending terminal as evident from the description heretofore given. According to the present invention, therefore, the period during which decoding of received video data is impossible can be shortened and rapid restoration to the normal video output status is assured.

Furthermore, in case there is provided such a function that when the sending terminal has received a refresh request from the receiving terminal the sending terminal disregards the request depending upon the transmission situation of video data, wasteful refresh processing and data transmission can be avoided.

We claim:

1. A video communication method for performing communication of coded video information between a sending terminal and a receiving terminal connected to each other via a network, the video communication method comprising the steps of:

converting, in the sending terminal, successive video frames into respective coded video frames according to a coding sequence, the coding sequence being periodically repeated and including a first coding mode wherein an initial video frame of the successive video frames is converted into an INTRA frame representative of only the initial video frame, and a second coding mode wherein remaining video frames of the successive video frames are converted into respective INTER frames each representative of a difference between a respective one of the successive video frames and a preceding one of the successive video frames;

transmitting, in the sending terminal, the coded video frames to the receiving terminal via the network;

detecting, in the receiving terminal, whether any portion of the transmitted coded video frames has been lost in transmission;

transmitting, in the receiving terminal, to the sending terminal via the network, a refresh request requesting the sending terminal to refresh a current coding sequence when it is detected that a portion of the transmitted coded video frames has been lost in transmission; and refreshing, in the sending terminal, in response to the transmitted refresh request, a current coding sequence by interrupting the current coding sequence and beginning a new coding sequence, thereby causing a next coded video frame transmitted to the receiving terminal via the network to be an INTRA frame.

2. A video communication method according to claim 1, wherein the INTER frames are each representative of a difference between a respective one of the successive video frames and an immediately preceding one of the successive video frames.

3. A video communication method according to claim 2, wherein the step of transmitting the coded video frames includes the steps of:

forming video packets each having a predetermined format from the coded video frames; and transmitting the video packets to the receiving terminal via the network.

4. A video communication method according to claim 3, wherein the step of forming video packets includes the steps of:

dividing the coded video frames into a plurality of blocks each having a predetermined length; and forming video packets each having a predetermined format from the blocks, each of the video packets being formed from a respective one of the blocks.

5. A video communication method according to claim 4, wherein the step of detecting whether any portion of the transmitted coded video frames has been lost in transmission is performed based on a time interval which has elapsed since one of the transmitted video packets was last received in the receiving terminal.

6. A video communication method according to claim 4, wherein the video packets include respective sequence information assigned to the video packets; and wherein the step of detecting whether any portion of the transmitted coded video frames has been lost in transmission is performed based on the sequence information of ones of the transmitted video packets which have been received in the receiving terminal.

7. A video communication method according to claim 4, wherein the refresh request includes information identifying the portion of the transmitted coded video frames which has been lost in transmission; and wherein the step of refreshing a current coding sequence includes the steps of:

determining, based on the information identifying the portion of the transmitted coded video frames which has been lost in transmission, a sequence relation between the portion of the transmitted coded video frames which has been lost in transmission and an INTRA frame which was last transmitted to the receiving terminal via the network;

deciding, based on the sequence relation, whether a current coding sequence should be refreshed; and refreshing, if it is decided that the current coding sequence should be refreshed, the current coding sequence by interrupting the current coding sequence and beginning a new coding sequence, thereby causing a next coded video frame transmitted to the receiving terminal via the network to be an INTRA frame.

8. A video communication method according to claim 3, wherein the step of detecting whether any portion of the transmitted coded video frames has been lost in transmission is performed based on a time interval which has elapsed since one of the transmitted video packets was last received in the receiving terminal.

9. A video communication method according to claim 3, wherein the video packets include respective sequence information assigned to the video packets; and wherein the step of detecting whether any portion of the transmitted coded video frames has been lost in transmission is performed based on the sequence information of ones of the transmitted video packets which have been received in the receiving terminal.

10. A video communication method according to claim 3, wherein the refresh request includes information identifying the portion of the transmitted coded video frames which has been lost in transmission; and wherein the step of refreshing a current coding sequence includes the steps of:

determining, based on the information identifying the portion of the transmitted coded video frames which has been lost in transmission, a sequence relation between the portion of the transmitted coded video frames which has been lost in transmission and an INTRA frame which was last transmitted to the receiving terminal via the network;

deciding, based on the sequence relation, whether a current coding sequence should be refreshed; and refreshing, if it is decided that the current coding sequence should be refreshed, the current coding sequence by interrupting the current coding sequence and beginning a new coding sequence, thereby causing a next coded video frame transmitted to the receiving terminal via the network to be an INTRA frame.

11. A video communication method according to claim 2, wherein the refresh request includes information identifying the portion of the transmitted coded video frames which has been lost in transmission; and wherein the step of refreshing a current coding sequence includes the steps of:

determining, based on the information identifying the portion of the transmitted coded video frames which has been lost in transmission, a sequence relation between the portion of the transmitted coded video frames which has been lost in transmission and an INTRA frame which was last transmitted to the receiving terminal via the network;

deciding, based on the sequence relation, whether a current coding sequence should be refreshed; and refreshing, if it is decided that the current coding sequence should be refreshed, the current coding sequence by interrupting the current coding sequence and beginning a new coded video frame transmitted to the receiving terminal via the network to be an INTRA frame.

12. A video communication method according to claim 1, wherein the refresh request includes information identifying the portion of the transmitted coded video frames which has been lost in transmission; and wherein the step of refreshing a current coding sequence includes the steps of:

determining, based on the information identifying the portion of the transmitted coded video frames which has been lost in transmission, a sequence relation between the portion of the transmitted coded video frames which has been lost in transmission and an INTRA frame which was last transmitted to the receiving terminal via the network;

deciding, based on the sequence relation, whether a current coding sequence should be refreshed; and refreshing, if it is decided that the current coding sequence should be refreshed, the current coding sequence by interrupting the current coding sequence and beginning a new coding sequence, thereby causing a next coded video frame transmitted to the receiving terminal via the network to be an INTRA frame.

13. A video communication method for performing communication of coded video information between a sending terminal and a plurality of receiving terminals connected to each other via a network, the video communication method comprising the steps of:

converting, in the sending terminal, successive video frames into respective coded video frames according to a coding sequence, the coding sequence being periodically repeated and including a first coding mode wherein an initial video frame of the successive video frames is converted into an INTRA frame representative of only the initial video frame, and a second coding mode wherein remaining video frames of the successive video frames are converted into respective INTER frames each representative of a difference between a respective one of the successive video frames and a preceding one of the successive video frames;

transmitting, in the sending terminal, the coded video frames to the receiving terminals via the network;

detecting, in each of the receiving terminals, whether any portion of the transmitted coded video frames has been lost in transmission;

transmitting, in each of the receiving terminals, to the sending terminal via the network, a refresh request requesting the sending terminal to refresh a current coding sequence when it is detected that a portion of the transmitted coded video frames has been lost in transmission;

monitoring, in the sending terminal, a time interval which has elapsed since a refresh request was last received in the sending terminal;

disregarding, in the sending terminal, a refresh request which has just been received in the sending terminal, if the time interval which has elapsed since a refresh request was last received in the sending terminal is less than a predetermined time interval; and refreshing, in the sending terminal, in response to the refresh request which has just been received in the sending terminal, a current coding sequence by interrupting the current coding sequence and beginning a new coding sequence, thereby causing a next coded video frame transmitted to the receiving terminals via the network to be an INTRA frame, if the time interval which has elapsed since a refresh request was last received in the sending terminal is not less than the predetermined time interval.

14. A video communication method according to claim 13, wherein the INTER frames are each representative of a difference between a respective one of the successive video frames and an immediately preceding one of the successive video frames.

15. A video communication method according to claim 13, wherein the step of transmitting the coded video frames includes the steps of:

forming video packets each having a predetermined format from the coded video frames; and transmitting the video packets to the receiving terminals via the network.

16. A video communication method according to claim 15, wherein the step of forming video packets includes the steps of:

dividing the coded video frames into a plurality of blocks each having a predetermined length; and forming video packets each having a predetermined format from the blocks, each of the video packets being formed from a respective one of the blocks.

17. A video communication method according to claim 15, wherein the step of detecting whether any portion of the transmitted coded video frames has been lost in transmission is performed based on a time interval which has elapsed since one of the transmitted video packets was last received in a respective one of the receiving terminals.

18. A video communication method according to claim 15, wherein the video packets include respective sequence information assigned to the video packets; and wherein the step of detecting whether any portion of the transmitted coded video frames has been lost in transmission is performed based on the sequence information of ones of the transmitted video packets which have been received in a respective one of the receiving terminals.

19. A video communication method according to claim 13, wherein the refresh request includes information identifying the portion of the transmitted coded video frames which has been lost in transmission; and wherein the step of refreshing a current coding sequence includes the steps of:

determining, based on the information identifying the portion of the transmitted coded video frames which has been lost in transmission, a sequence relation between the portion of the transmitted coded video frames which has been lost in transmission and an INTRA frame which was last transmitted to the receiving terminals via the network;

deciding, based on the sequence relation, whether a current coding sequence should be refreshed; and refreshing, if it is decided that the current coding sequence should be refreshed, the current coding sequence by interrupting the current coding sequence and beginning a new coding sequence, thereby causing a next coded video frame transmitted to the receiving terminals via the network to be an INTRA frame.

20. A receiving terminal for receiving coded video information from a sending terminal via a network, the receiving terminal comprising:

receiving means for receiving, from the network, coded video frames transmitted to the network by the sending terminal, the sending terminal having generated the coded video frames by converting successive video frames into respective ones of the coded video frames according to a coding sequence, the coding sequence being periodically repeated and including a first coding mode wherein an initial video frame of the successive video frames is converted into an INTRA frame representative of only the initial video frame, and a second coding mode wherein remaining video frames of the successive video frames are converted into respective INTER frames each representative of a difference between a respective one of the successive video frames and a preceding one of the successive video frames;

decoding means for decoding the received coded video frames;

detecting means for detecting, based on the received coded video frames, whether any portion of the transmitted coded video frames has been lost in transmission; and transmitting means for transmitting, to the network, a refresh request requesting the sending terminal to refresh a current coding sequence when the detecting means detects that a portion of the transmitted coded video frames has been lost in transmission, the refresh request causing the sending terminal to refresh a current coding sequence by interrupting the current coding sequence and beginning a new coding sequence, thereby causing a next coded video frame transmitted to the network to be an INTRA frame.

21. A receiving terminal according to claim 20, wherein the refresh request includes information identifying the portion of the transmitted coded video frames which has been lost in transmission.

* * * * *